United States Patent
Yamamoto et al.

(10) Patent No.: US 7,417,218 B2
(45) Date of Patent: Aug. 26, 2008

(54) TRIPLE GRATING OPTICAL ENCODER WITH LIGHT TRANSMITTING AREA IN OPTICAL PATH

(75) Inventors: Eiji Yamamoto, Oume (JP); Yoshimi Kuroda, Funabashi (JP); Jun Hane, Tokyo (JP); Iwao Komazaki, Saitama (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 11/417,357

(22) Filed: May 3, 2006

(65) Prior Publication Data
US 2006/0255252 A1 Nov. 16, 2006

(30) Foreign Application Priority Data
May 12, 2005 (JP) .............................. 2005-139401

(51) Int. Cl.
G01D 5/34 (2006.01)
(52) U.S. Cl. .............................. 250/231.13; 250/237 G
(58) Field of Classification Search ................................. 250/231.13–231.18, 237 G, 237 R
See application file for complete search history.

(56) References Cited

U.S. PATENT DOCUMENTS

| 4,695,719 A | 9/1987 | Wilwerding |
| 6,528,779 B1* | 3/2003 | Franz et al. ............... 250/214.1 |
| 6,603,114 B1* | 8/2003 | Holzapfel et al. ...... 250/231.14 |
| 2003/0189213 A1* | 10/2003 | Igaki et al. ..................... 257/81 |
| 2005/0023450 A1* | 2/2005 | Ito ............................ 250/231.13 |
| 2005/0218313 A1* | 10/2005 | Kuroda ..................... 250/231.13 |
| 2006/0007451 A1* | 1/2006 | Ito .............................. 356/616 |

FOREIGN PATENT DOCUMENTS

| EP | 0 672 891 A1 | 9/1995 |
| EP | 0 843 159 A2 | 5/1998 |
| GB | 2247313 A | 2/1992 |
| JP | 2003-166856 | 6/2003 |

OTHER PUBLICATIONS

Palik, Edward D. Handbook of Optical Constants of Solids. (pp. 771-774). Elsevier. 1998. Accessed Jul. 17, 2007. <http://www.knovel.com/knovel2/Toc.jsp?BookID=1669&VerticalID=0>.*

* cited by examiner

Primary Examiner—Seung C Sohn
(74) Attorney, Agent, or Firm—Scully, Scott, Murphy & Presser, P.C.

(57) ABSTRACT

An optical encoder is a reflecting triple grating type optical encoder. A light projecting section of the optical encoder which includes a combination of a bare chip LED and a first grating of a first pitch p1, irradiates a predetermined light. A photodetecting section of the optical encoder which includes a combination of a photodetector and a third grating of a third pitch p3 detects a movement of a self image. Each of the first grating and the third grating is disposed substantially parallel with respect to a scale, and a substantially parallel and substantially flat light transmitting area is formed in a predetermined portion of a surface of a detecting head. A light transparent member is disposed in a space between the surface of the detecting head, and the first grating and the second grating.

14 Claims, 21 Drawing Sheets

PRIOR ART

TRIPLE GRATING OPTICAL ENCODER WITH LIGHT TRANSMITTING AREA IN OPTICAL PATH

CROSS-REFERENCE TO RELATED APPLICATION

The present application is based upon and claims the benefit of priority from the prior Japanese Patent Application No. 2005-139401 filed on May 12, 2005; the entire contents of which are incorporated herein by reference.

BACKGROUND OF THE INVENTION

1. Field of the Invention

The present invention relates to a reflecting triple grating type optical encoder which detects a position of an object to be detected.

2. Description of the Related Art

An optical encoder which includes a detecting head and a scale are hitherto known (refer to Japanese Patent Application Laid-open Publication No. 2003-166856 for example). FIG. 21 shows an example of a structure disclosed in Japanese Patent Application Laid-open Publication No. 2003-166856. The detecting head includes a light source 14 in which a first grating 11 is disposed, and a photodetector 50 in which a third grating 30 is disposed. Moreover, a second grating 20 is formed on a scale 21. Light emerged from the light source 14 forms a self image on a light receiving surface of the photodetector 50 upon being affected by the first grating 11 and the second grating 20. In this patent application, "self image" means an optical pattern having a shape substantially similar to the second grating 20 formed on the light receiving surface of the photodetector 50. Moreover, the self image moves according to a relative displacement of the detecting head and the scale 21. The photodetector 50 detects the movement of the self image. Such type, hereinafter, will be called as a "reflecting triple grating type".

In the reflecting triple grating type optical encoder, it is desirable to perform a detection which is not affected easily by a change in a distance between the scale and the detecting head. For this, the first grating and the third grating included in the detecting head are disposed by lining up the heights thereof. Moreover, the self image can be classified into the following two typical cases (a) and (b) for example, according to structural conditions of the optical encoder, where case (a) is a case of having a same space period as of a shadow pattern of the second grating, and case (b) is a case of having the space period ½, ¼, and . . . of the shadow pattern of the second grating.

The most stable and the clearest image is formed in the case (a) mentioned above. Therefore, the case (a) mentioned above will be described below.

When the following conditional equation (1) is satisfied, a self image having the same space period as of the shadow pattern of the second grating is observed on the light receiving surface of the photodetector.

$$1/z1 + 1/z2 = \lambda/(k \times p2^2) \qquad (1)$$

where, $\lambda$ denotes a central wavelength of light emitted from the light source, $z1$ denotes an optical distance between the first grating and the second grating, $z2$ denotes an optical distance between the second grating and the third grating, $p2$ denotes a pitch of the second grating, and $k$ denotes a natural number.

Here, when $\Delta z0$ is let to be a difference between $z2$ and $z1$, which is designed in advance, $\Delta z$ is let to be a difference between $z2$ and $z1$ when actually manufactured, and $\Delta zd$ is let to be a difference between $\Delta z0$ and $\Delta z$ which occurred when actually manufactured (in other words, a difference between $\Delta z0$ designed in advance and $\Delta z$ when actually prepared) the following equation (2) holds.

$$\Delta z = \Delta z0 + \Delta zd \qquad (2)$$

Inventors of this patent application performed the following experiment, and calculated a tolerance of $\Delta zd$ required for achieving satisfactory signal strength by the photodetector. According to results of the experiment, it was revealed that, with predetermined conditions, to achieve the satisfactory signal amplitude at the photodetector, such as signal strength at which the maximum signal amplitude is ½ for example, the tolerance of $\Delta zd$ is ±36 μm. Moreover, it was revealed that with other conditions, for achieving the satisfactory signal strength at the photodetector, the tolerance of $\Delta zd$ is approximately ±33 μm. Generally, the tolerance of machining accuracy is in a range of ±50 μm to ±100 μm. Therefore, from a point of view of manufacturing, it is extremely difficult to dispose by mounting the first grating, the second grating, and the third grating such that the $\Delta zd$ is in a range of ±36 μm to ±33 μm. Moreover, when an attempt is made to realize an optical encoder in which $\Delta zd$ is not greater than the range of ±36 μm to ±33 μm, a dimensional tolerance of structure members of the optical encoder being small, it becomes very difficult to manufacture at a low cost. Moreover, in the conventional example described above, a concrete method or a structure which is assembled with the tolerance $\Delta zd$ to be very small is not at all disclosed.

SUMMARY OF THE INVENTION

The present invention is made in view of the aforementioned problems, and an object of the present invention is to realize a tolerance which makes the manufacturing easy by relaxing a tolerance of $\Delta zd$ mentioned above, and to provide a triple grating type optical encoder which can be mass produced at a low cost.

To find a solution to the aforementioned issues, and to achieve the object, there can be provided an optical encoder which includes a scale which is installed on one of members of which a displacement is detected, and a detecting head which is installed on other member which is displaced relatively with respect to the one of the members, and which is disposed facing the scale, where the scale is provided with a second grating which has an optical pattern of a second pitch for a direction of the relative displacement, and the detecting head is provided with a light projecting section which irradiates a predetermined light on the scale, and a photodetecting section which detects a movement of a self image which is formed on a light receiving surface of a photodetector by light which is irradiated from the light projecting section to the scale, and which is reflected and diffracted by the second grating.

In this optical encoder, the light projecting section is structured to irradiate the predetermined light by combining a light source and a first grating which is disposed on a side facing the scale with respect to the light source, and, an optical grating of a first pitch is formed in the first grating with respect to a direction of the relative displacement.

The photodetecting section is structured to detect the movement of the self image by combining the photodetector and a third grating which is disposed on the light receiving surface of the photodetector, and an optical grating of a third pitch is formed in the third grating for the direction of the relative displacement.

Each of a formation surface of the first grating and a formation surface of the third grating is disposed substantially parallel with respect to the scale, and in an optical path of light emitting from the light projecting section and reaching up to the photodetecting section upon being reflected and diffracted by the scale, a light transmitting area which is substantially flat and substantially parallel to the scale is formed on a surface of the detecting head facing the scale.

A light transparent member which has a refractive index greater than 1 is disposed in a space between the surface of the detecting head and the first grating, and in a space between the surface of the detecting head and the third grating.

Moreover according to a preferable aspect of the present invention, it is desirable that the first grating includes an optical grating formed on a light transparent substrate, and the light projecting section is structured by attaching the light transparent substrate to a light emitting surface of the light source.

Moreover according to another preferable aspect of the present invention, it is desirable that the first grating is an optical grating formed directly on the light emitting surface of the light source, or an electrode pattern in the form of a grating which also serves as an electric current injecting electrode of the light source.

Furthermore, according to still another preferable aspect of the present invention, it is desirable that the light source is a bare chip or a surface emitting semiconductor device in which the bare chip is seal-molded.

According to still another preferable aspect of the present invention, it is desirable that at least one of the first grating and the third grating is an optical grating formed in the light transparent substrate, and a side surface of the light transparent substrate is covered by a light transparent resin.

Moreover, according to still another preferable aspect of the present invention, it is desirable that at least a space from the first grating and the third grating up to the surface of the detecting head is sealed by the light transparent resin.

Furthermore, according to still another aspect of the present invention, it is desirable that a light transparent member in the form of a plate disposed parallel to the scale is disposed on a side facing the scale with respect to the first grating and the third grating, and the light transparent substrate or a light transparent resin is disposed in a space between the light transparent member in the form of a plate and the first grating, and in a space between the light transparent member in the form of a plate and the third grating.

According to the present invention, there can be provided an optical encoder which includes a scale which is installed on one of members of which a displacement is detected, and a detecting head which is installed on other member which is displaced relatively with respect to the one of the members, and which is disposed facing the scale, where the scale is provided with a second grating which has an optical pattern of a second pitch with respect to the direction of the relative displacement, and the detecting head is provided with a light projecting section which irradiates a predetermined light on the scale, and a photodetecting section which detects a movement of a self image which is formed on a light receiving surface of a photodetector by light which is irradiated from the light projecting section to the scale, and which is reflected and diffracted by the second grating.

In this optical encoder, the light projecting section is structured to irradiate the predetermined light by combining a light source and a first grating which is disposed on a side facing the scale with respect to the light source, and an optical grating of a first pitch is formed in the first grating with respect to the direction of the relative displacement.

The photodetecting section is structured to detect the movement of the self image by a photodetector and at least one light receiving element array disposed on the photodetecting section.

The light receiving element array includes light receiving elements having a pitch of substantial integral multiples of a periodic intensity distribution of the self image, and each light receiving element in the light receiving element array is disposed by shifting through a fixed dimension in the direction of relative displacement, and the light receiving surface and the formation surface of the first grating are disposed substantially parallel with respect to the scale, and in an optical path of light emitting from the light projecting section and reaching up to the photodetecting section upon being reflected and diffracted by the scale, the light transmitting area which is substantially flat and substantially parallel to the scale is formed on the surface of the detecting head facing the scale.

The light transparent member which has a refractive index greater than 1 is disposed in the space between the surface of the detecting head and the first grating, and in the space between the surface of the detecting head and the light receiving element array.

Moreover, according to still another preferable aspect of the present invention, it is desirable that the first grating includes an optical grating formed on a light transparent substrate, and the light projecting section is structured by attaching the light transparent substrate to the light emitting surface of the light source.

Furthermore, according to still another preferable aspect of the present invention, it is desirable that the first grating is an optical grating formed directly on the light emitting surface of the light source, or an electrode pattern in the form of a grating which also serves as the electric current injecting electrode of the light source.

According to still another preferable aspect of the present invention, it is desirable that the light source is a bare chip or a surface emitting semiconductor device in which the bare chip is seal-molded.

Moreover, according to still another preferable aspect of the present invention, it is desirable that the first grating is an optical grating formed in the light transparent substrate, and the side surface of the light transparent substrate is covered by a light transparent resin.

Furthermore, according to still another preferable aspect of the present invention, it is desirable that at least the space from the first grating up to the surface of the detecting head, and the space from the light receiving element array up to the surface of the detecting head are sealed by a light transparent resin.

According to still another preferable aspect of the present invention, it is desirable that the light transparent member in the form of a plate disposed parallel to the scale is disposed on a side facing the scale with respect to the first grating and the light receiving surface, and the light transparent substrate or a light transparent resin is disposed in the space between the light transparent member in the form of a plate and the first grating, and in a space between the light transparent member in the form of a plate and the light receiving surface.

Moreover, according to still another preferable aspect of the present invention, it is desirable that the light transparent member, a light transparent substrate, and a light transparent resin have a predetermined optical transmittance with respect to a predetermined wavelength region in which a light from the light source is emerged, and the optical transmittance is not greater than ½ with respect to at least one of a light of a wavelength side longer than the predetermined wavelength region, and a light of a wavelength side shorter than the predetermined wavelength region.

Furthermore, according to still another preferable aspect of the present invention, it is desirable that a refractive index of the light transparent member is not less than 1.4 in a central wavelength of light emerged from the light source.

DETAILED DESCRIPTION OF THE PREFERRED EMBODIMENTS

Embodiments of an optical encoder according to the present invention will be described below in detail with reference to accompanying diagrams. However, the present invention is not restricted to the embodiments described below.

First Embodiment

Figure 1:
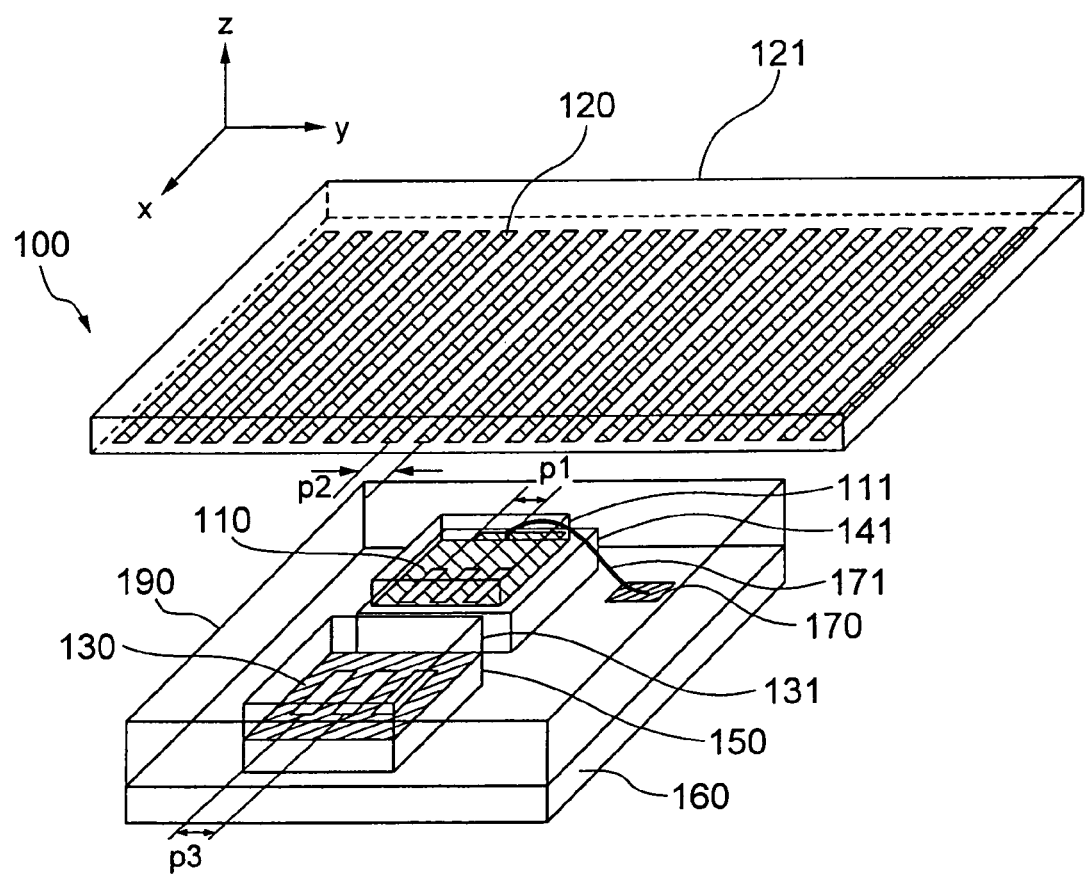
FIG. 1 is a perspective view of a structure of an optical encoder according to a first embodiment of the present invention.
Figure 2:
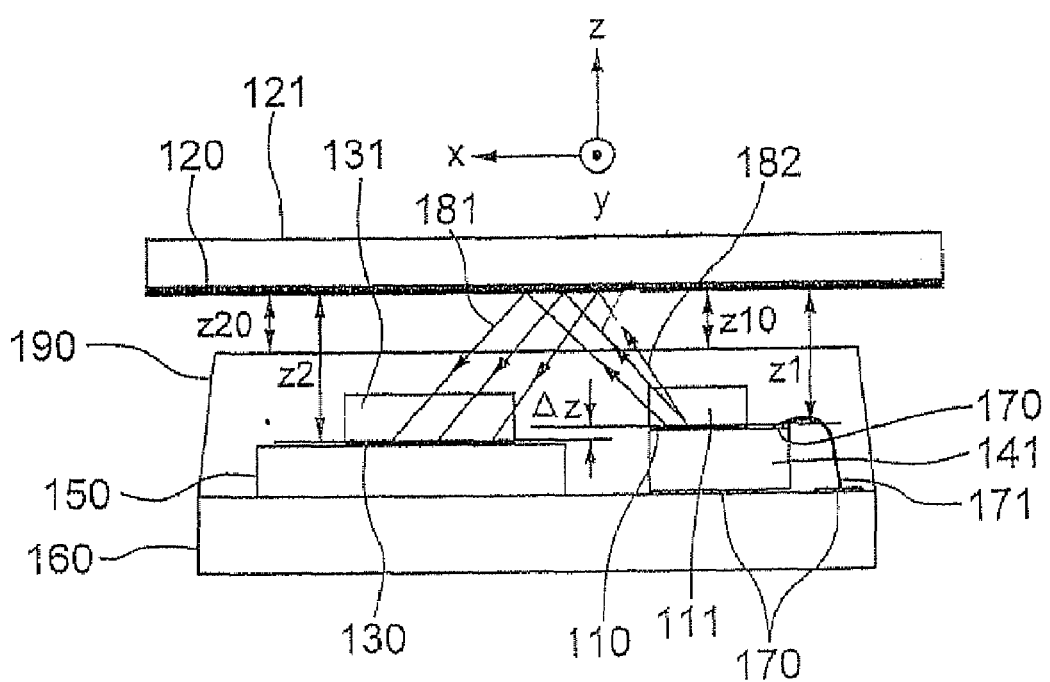
FIG. 2 is a cross-sectional view of the structure of the optical encoder according to the first embodiment.

FIG. 1 is a perspective view of a structure an optical encoder 100 according to a first embodiment of the present invention. FIG. 2 is a cross-sectional view of the structure of the optical encoder 100 according to the first embodiment. Firstly, the structure of the optical encoder 100 will be described. Further, an experiment related to a tolerance carried out by inventors of the present patent application will be described. Based on a result of the experiment, an action effect of the first embodiment will be described.

To start with, the structure of the optical encoder 100 according to the first embodiment will be described. A scale 121 having a flat and parallel form is disposed as one of members detecting a displacement. A second grating 120 is formed on a surface of the scale 121 towards a detecting head. The second grating 120 is an optical pattern formed by a second pitch p2 with respect to a direction along y axis in FIG. 1 and FIG. 2 for example, which is a direction of relative displacement of the scale 121 and a substrate 160 which will be described later.

Moreover, a bare chip LED 141 and a light transparent substrate 111 are stacked on the substrate 160. The substrate 160 corresponds to other member which is displaced relatively with respect to the scale 121. The bare chip LED 141 corresponds to a light source. A first grating 110 is formed on a surface of the light transparent substrate 111 on a side of the bare chip LED 141. The first grating 110 is an optical pattern formed by a first pitch p1 with respect to the direction along y axis in which the scale 121 and the substrate 160 are displaced relatively. A combination of the bare chip LED 141 and the first grating 110 corresponds to a light projecting section. Moreover, the bare chip LED 141 irradiates light of a wavelength λ=650 nm for example.

A photodetector 150 and a light transparent substrate 131 are stacked on the substrate 160. A third grating 130 is formed on a surface of the light transparent substrate 131 on a side of the photodetector 150. The third grating 130 is an optical pattern formed by a third pitch p3 with respect to the direction along y axis in which the scale 121 and the substrate 160 are displaced relatively. A combination of the photodetector 150 and the third grating 130 corresponds to the photodetecting section. Further, a structure in which the projecting section and the photodetecting section are combined corresponds to the detecting head.

The photodetecting section which includes the photodetector 150 and the third grating 130 detects a movement of a self image which is formed on a light receiving surface of the photodetector 150 by light which is irradiated from the light projecting section to the scale 121, and which is reflected and diffracted by the second grating 120.

The bare chip LED 141, the light transparent substrate 111, the photodetector 150, and the light transparent substrate 131 which are disposed on the substrate 160 are embedded to be covered by a light transparent resin 190.

Each of a formation surface of the first grating 110 and a formation surface of the third grating 130, is disposed parallel with respect to the scale 121. Moreover, in an optical path of light emitting from the light projecting section and reaching up to the photodetecting section upon being reflected and diffracted, a light transmitting area which is substantially flat and substantially parallel to the scale 121 is formed on a surface of the detecting head facing the scale 121. In other words, a surface of the light transparent resin 190 on a side of the scale 121 is formed to be substantially flat and substantially parallel with respect to the scale 121.

The scale 121 on which the second grating 120 is formed is disposed parallel to the first grating 110 and the third grating 130 such that the scale 121 is capable of a relative displacement in y direction. Here, a plane parallel to the formation surface of the first grating 110, the formation surface of the second grating 120, and the formation surface of the third grating 130 is let to be xy plane. Moreover, y direction is let to be a grating pitch direction of the second grating 120, x direction is let to be a direction perpendicular to the grating pitch direction of the second grating 120, and z direction is let to be a direction perpendicular to the xy plane.

An electrode pad 170 is formed on an upper surface of the bare chip LED 141. The electrode pad 170 on the bare chip LED 141 is connected to another electrode pad 170 on the substrate 160 via an electroconductive wire 171. Electrical wiring of the light source and the photodetector is omitted in FIG. 1 and FIG. 2.

(Experiment Related to Tolerance of Grating Position)

Next, an experiment related to a tolerance of mutual positions of the first grating 110, the second grating 120, and the third grating 130 which was carried out by inventors of the present patent application will be described.

A case of observing an optical pattern substantially similar to the second grating 120 formed on the light receiving surface of the photodetector 150, in other words, a case of observing the self image is taken into consideration. An intensity distribution period p33 of the self image on the light receiving surface of the photodetector 150 becomes, $$p33 = p2 \times (z1+z2)/z1 \quad (3)$$

$$= p2 \times (2+\Delta z/z1) \quad (4)$$

Here, $\Delta z$ was let to be $$\Delta z = z2 - z1 \quad (5)$$

Therefore, it is desirable to match the third pitch p3 of the third grating 130 with the intensity distribution period p33 of the self image, or to make a multiple thereof. Accordingly, when the scale 121 is displaced, the movement of the self image on the light receiving surface can be captured with the maximum amplitude.

In other words, by setting $$p3 = p33 \times m \quad (6)$$

the maximum signal amplitude from the photodetector 150 is obtained. Here, m is a natural number.

Furthermore, from an optical symmetry property of the first grating 110 and the third grating 130, the optimum period p1 of the first grating 110 for forming a clear self image is $$p1 = p2 \times (z1+z2)/z2 \quad (7)$$
$$= p2 \times (2-\Delta z/z2) \quad (8)$$

Furthermore, when $\Delta z0$ is let to be a difference between z2 and z1, which is designed in advance, $\Delta z$ is let to be a difference between z2 and z1 when actually manufactured, and $\Delta zd$ is let to be a difference between $\Delta z0$ and $\Delta z$ which occurred when actually manufactured (in other words, a difference between $\Delta z0$ designed in advance and $\Delta z$ when actually prepared), the following equation (2) holds.

$$\Delta z = \Delta z0 + \Delta zd \quad (2)$$

Figure 21:
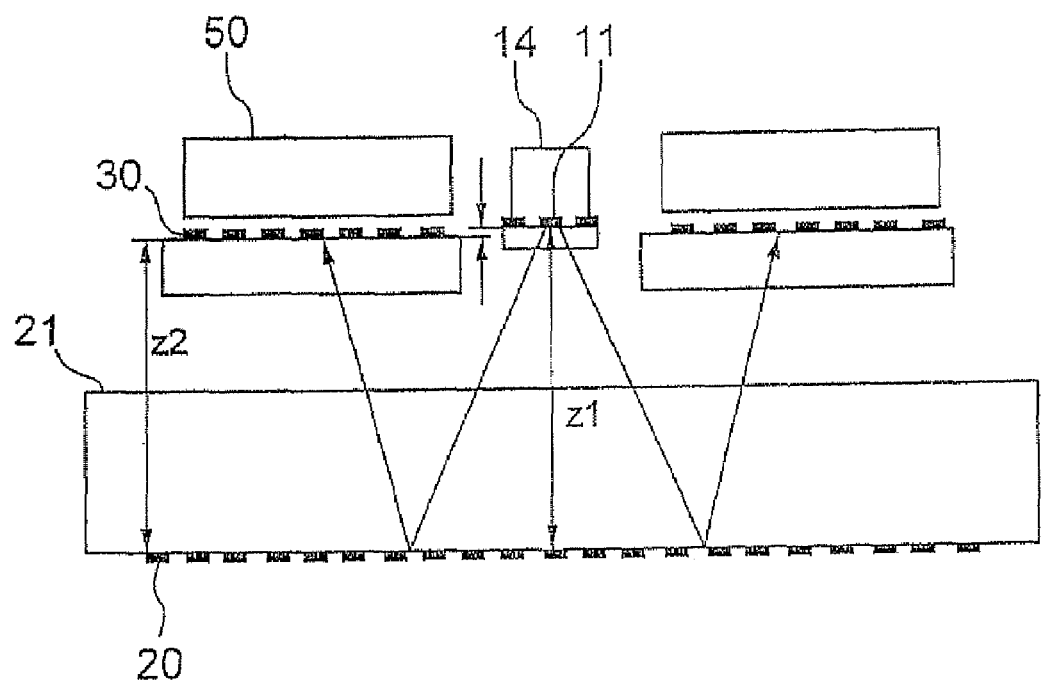
FIG. 21 is a cross-sectional view of a structure of an optical encoder of a conventional technology.

Particularly, when z1=z2, in other words, in a structure where $\Delta z=0$ in FIG. 21 which is an example of the conventional technology, $$2/z1 = \lambda/(n \times p2^2) \quad (9)$$

$$p1 = p33 = 2 \times p2 \quad (10)$$

Therefore, the first pitch p1 of the first grating 110, the second pitch p2 of the second grating 120, and the third pitch p3 of the third grating 130 may be set in advance such that p1=p3=2×p2. When the relation becomes p1=p3=2×p2, it is easy to design each pitch of the first grating 110, the second grating 120, and the third grating 130.

Generally, $\Delta z=0$, in other words, z1=z2, is not an essential condition. In this case, for a value of $\Delta z0$ set in advance, each of structural parameters $\lambda$, z1, z2, p1, p2, and p3 may be set in advance based on equations (1) to (8).

Moreover, when z1 and z2 are disposed with a value different from the set value, in other words, when $\Delta zd \neq 0$, in conjunction with this, the values $\Delta z/z1$ and $\Delta z/z2$ in equations (4) and (8) change. Therefore, the optimum value of p1 and p3 is changed from the value set in advance. This is because the pitch p3 of the third grating and the intensity distribution period p33 of the self image are mismatched, and a value of the optimum pitch p1 of the first grating which forms the clear self image is changed.

Therefore, when $\Delta zd \neq 0$, in other words, when z1 and z2 are disposed with the set value mismatched, signal amplitude from the photodetector 150 is decreased. Therefore, disposing z1 and z2 by taking as close as possible to the set value, in other words, making $\Delta zd$ which occurs during manufacturing, as small as possible, and manufacturing the first grating 110 and the third grating 130 such that there is no variation from the set height, is a point in realizing a high-performance encoder.

Figure 3:
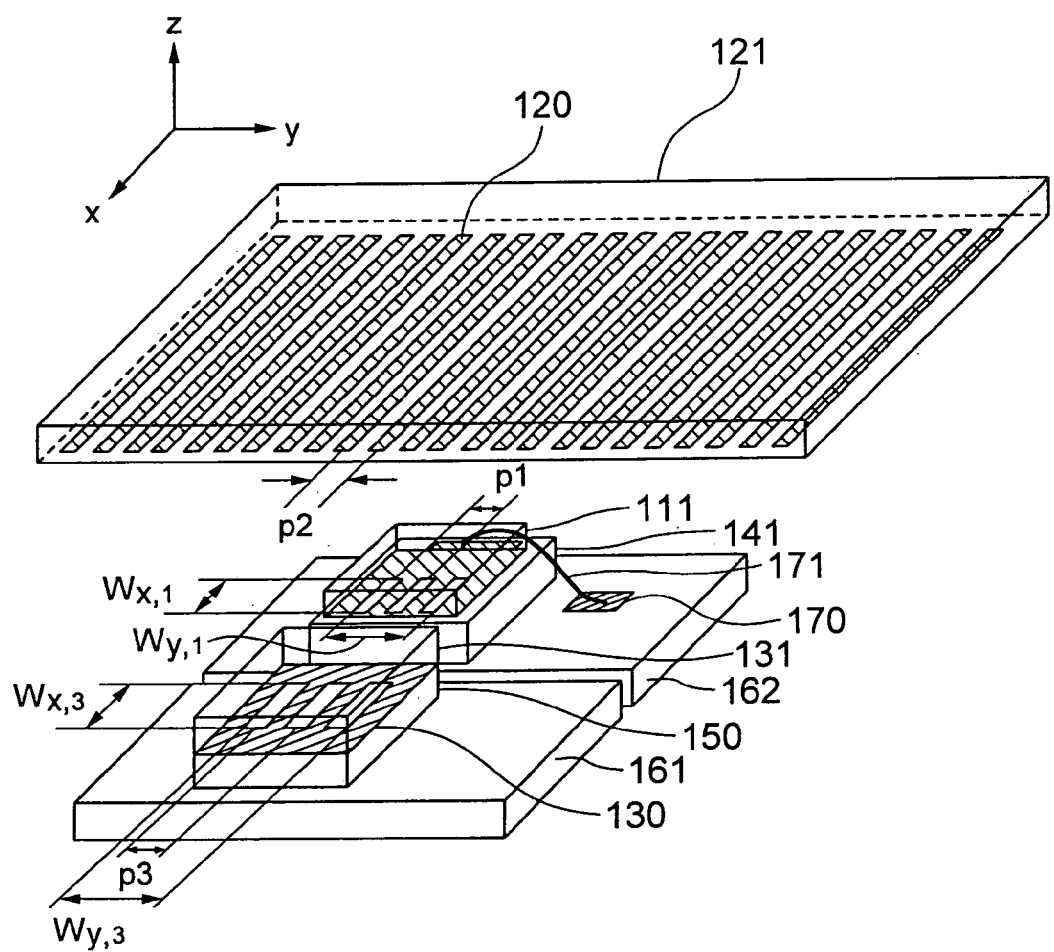
FIG. 3 is a perspective view of a structure of an optical encoder used for an experiment.
Figure 4:
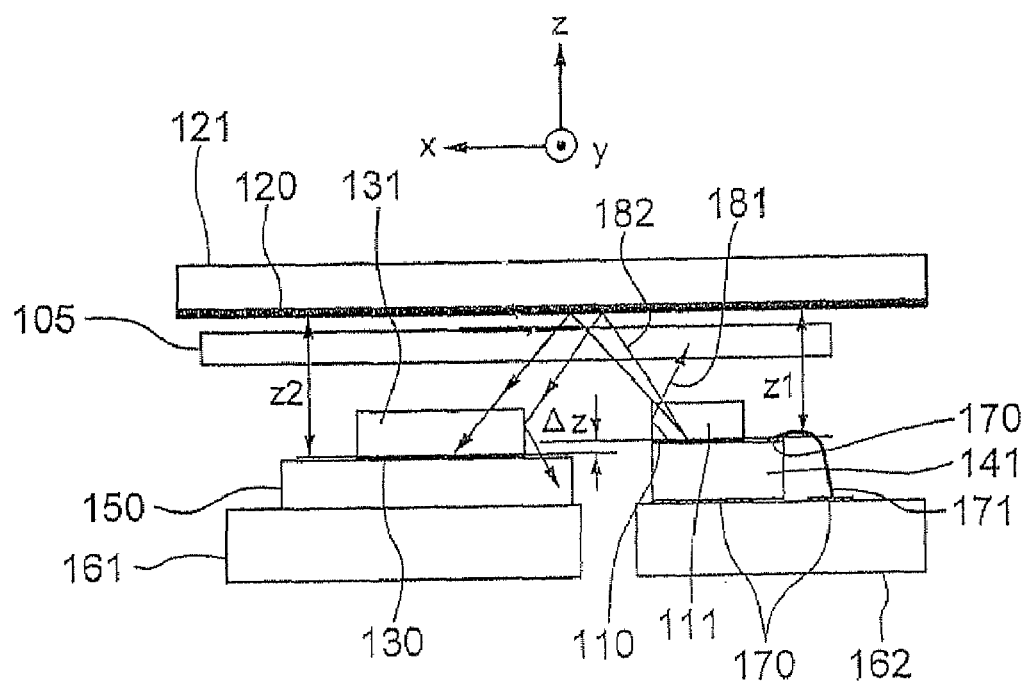
FIG. 4 is a cross-sectional view of the structure of the optical encoder used for the experiment.

The inventors of the present invention carried out an experiment about a relation of $\Delta zd$ and the signal amplitude from the photodetector 150 for a structure in FIG. 3 and FIG. 4, to find the tolerance of $\Delta zd$ for a reflecting triple grating type optical encoder.

A structure of an encoder used in the experiment will be described with reference to FIG. 3 and FIG. 4. The bare chip LED 141 and the light transparent substrate 111 on which the first grating 110 is formed are stacked on a substrate 162. The photodetector 150 and the light transparent substrate 131 on which the third grating 130 is formed are stacked on a substrate 161 which is a substrate apart from the substrate 162.

On the other hand, the scale 121 on which the second grating 120 is formed, is disposed parallel to the formation surface of the first grating 110 and the formation surface of the third grating 130. Here, the plane parallel to each of the formation surfaces of the first grating 110, the second grating 120, and the third grating 130 is let to be xy plane. Moreover, y direction is let to be the grating pitch direction of the second grating 120, x direction is let to be the direction perpendicular to the grating pitch direction of the second grating 120, and z direction is let to be the direction perpendicular to the xy plane. A light transmission plate 105 shown in FIG. 4 is to be neglected in the description of this experiment.

When the scale 121 is displaced in y direction, the self image described above is moved in y direction on the formation surface of the third grating 130. Accordingly, a periodic quasi-sinusoidal waveform signal is obtained from the photodetector 150. According to a result of the experiment, an amplitude of the periodic quasi-sinusoidal waveform signal changed as shown in FIG. 5 when $\Delta zd$ was changed.

Figure 5:
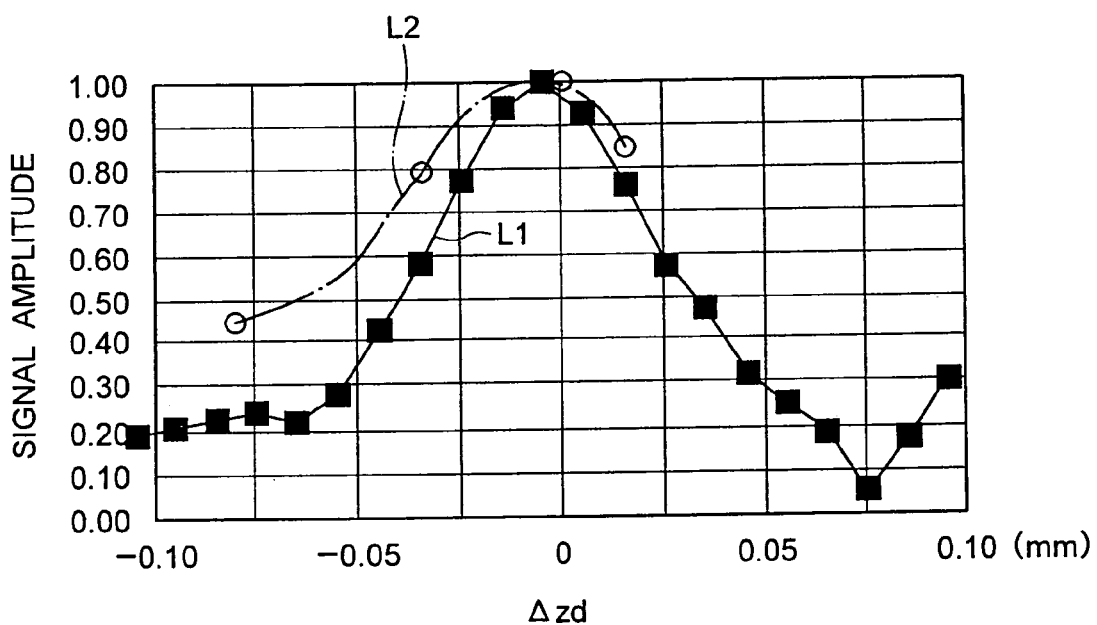
FIG. 5 is a diagram showing a result of the experiment.

A horizontal axis in FIG. 5 denotes $\Delta zd$ (unit: mm), and a vertical axis denotes the signal amplitude (unit: arbitrary, normalized with the maximum value). Experiment conditions are $\lambda$=650 nm, p2=20 μm, and n=1.

Moreover, an effective area of the first grating 110 is let to be 0.15 mm×0.15 mm (in FIG. 3, $W_{x,1}=W_{y,1}$=0.15 mm), and an effective area of the third grating 130 is let to be 1.0 mm×0.5 mm (in FIG. 3, $W_{x,3}$=0.5 mm and $W_{y,3}$=1.0 mm).

First of all, for each case for which $\Delta z0$ is set to be $\Delta z0$=0 and $\Delta z0$=0.03, initially z1 and z2, and p1 and p3 are determined by equations (1) to (8). Next, z1 is kept constant and z2 is changed. Accordingly, the height of the first grating 110 and the third grating 130 is changed and the signal amplitude obtained from the photodetector 150 is measured.

According to the experiment result, when p1, p3, z1, and z2 are set to have optimum condition with $\Delta z0$=0, a result denoted by a curve L1 in FIG. 5 (continuous line) is obtained. In the curve L1, the tolerance of $\Delta zd$ at which the signal amplitude becomes ½ is approximately ±36 μm.

Moreover, in an experiment in which the maximum amplitude is obtained when $\Delta z0$=0.03 mm, a value of the tolerance of $\Delta zd$ achieved is ±33 μm. In other words, when $\Delta z0$=0.03 mm, it is necessary to contain the value of $\Delta z$ to be about 0.03 mm±33 μm.

As it is clear from the result, with the typical experiment conditions mentioned above, the first grating 110, the second grating 120, and the third grating 130 are required to be disposed by mounting such that $\Delta zd$ is not greater than ±36 μm to ±33 μm.

(Action and Effect of First Embodiment)

Next, an action and an effect of the first embodiment will be described. Thus, according to the result of the experiment, the first grating 110, the second grating 120, and the third grating 130 are required to be disposed by mounting such that $\Delta zd$ is not greater than ±36 μm to ±33 μm. Whereas, as mentioned above, a normal tolerance of machining accuracy is in a range of about ±50 μm to ±100 μm. Therefore, from a manufacturing point of view, it is extremely difficult to dispose by mounting the first grating 110, the second grating 120, and the third grating 130 such that $\Delta zd$ is not greater than ±36 μm to ±33 μm.

First of all, to explain the effect of the first embodiment, further experiment was carried out by using the optical encoder of the first embodiment described in FIG. 1 and FIG. 2. An optical encoder having a different $\Delta z$ (height of the first grating 110 and the third grating 130) shown in FIG. 2 is prepared by changing a thickness of the photodetector 150. For each one, an entire detecting head is filled with a light transparent resin having a refractive index of approximately 1.6, and sealed.

p1, p3, z1, and z2 are set to have the optimum conditions with $\Delta z0$=0, and the signal amplitude obtained from the photodetector for a detecting head having a different $\Delta z$ is denoted by curve L2 in FIG. 5 (denoted by alternate long and short dash line). As it is clear from FIG. 5, when the entire detecting head is filled with the light transparent resin 190 and sealed, the tolerance of $\Delta zd$ for which the signal amplitude is ½ is approximately ±62 μm. It is revealed that the tolerance is relaxed (becomes large) by approximately 1.7 times as compared to a case in air mentioned above (curve L1 in FIG. 5).

Next, a result of a supplementary experiment carried out for considering a basic principle of relaxing of the tolerance of $\Delta zd$ will be described. In this supplementary experiment, in a structure shown in FIG. 4, by changing a thickness t of the light transmission plate 105, the optimum designing of the pitch p1 and p3 for a case of $\Delta zd$=0 was performed, and a value of z1 (=z2) at which the signal amplitude becomes the maximum was measured.

Accordingly, when the thickness of the light transmission plate 105 is let to be t, the refractive index of the light transmission plate 105 is let to be nindex, and the refractive index in the air is let to be 1, when the light transmission plate 105 is there, it was observed that the value of z1 and z2 at which the maximum signal amplitude can be achieved is increased by t×(nindex −1) as compared to when the light transmission plate 105 is not there.

In other words, when a space in an optical path of an optical ray is filled with a member having a refractive index nindex, the value of z1 and z2 in equations (1), (3), (4), (7), and (8) may be considered to be 1/nindex times with respect to a geometric dimension for a portion which is the member having the refractive index nindex. Thus, it was revealed that it is necessary to have a way of thinking different from a common sense for a normal optical path length (optical path length becomes nindex times of the geometric dimension). It has been confirmed by an observation of the intensity distribution on the light receiving surface that the amplitude of spatial intensity distribution of the self image of the scale 121 and the second grating 120 is hardly changed according to a presence or an absence of the light transmission plate 105.

Therefore, when the light transparent member having a refractive index nindex is filled in the optical path of light emitting from the projecting section, reflected and diffracted at the scale 121, and reaching the photodetecting section, a rate of change of the optimum value of the pitch p1 and p3 determined by equations (4) and (8) is considered to be 1/nindex as compared to a case in the air.

A distance between the surface of the detecting head on the light projecting section and the formation surface of the second grating 120 is let to be z10 and the distance between a surface of the detecting head on the photodetecting section and the formation surface of the second grating 120 is let to be z20. At this time, in the first embodiment, in the optical path of light the light emerged from the light projecting section and reached up to the photodetecting section upon being reflected and diffracted by the scale 121, a light transmitting area which is substantially flat and substantially parallel to the scale 121 is formed on the surface of the detecting head facing the scale 121.

Therefore a difference between z20 and z10 is considered to have very small variation from a designed value. Therefore, Δzd mentioned above is determined by the following two factors (a) and (b).
(a) A manufacturing variability of a difference in the height of the first grating 110 and the height of the third grating 130
(b) A refractive index of a space between the surface of the detecting head on the light projecting section and the first grating 110, and between the surface of the detecting head on the photodetector and the third grating 130.

As a result, when the space between the surface of the detecting head on the light projecting section and the first grating 110, and between the surface of the detecting head on the photodetector and the third grating 130 is filled by the member having the refractive index nindex, a tolerance of the manufacturing variability in difference of the height of the first grating 110 and the height of the third grating 130 is increased by nindex times.

A normal light transparent member has a refractive index not less than 1, glass has a refractive index of about 1.5 and a light transparent resin has a refractive index of about 1.4 to 2 for example. Therefore, when the glass or the light transparent resin is used, the tolerance of the heights of the first grating 110 and the third grating 130 is relaxed by about 1.4 to 2 times. This is a reason for the tolerance of Δzd relaxed when the entire detecting head is filled with the light transparent resin 190 and sealed. Moreover, it is desirable that the refractive index of the light transparent member is not less than 1.4 in the central wavelength of light emerged from the light source. It is desirable for all embodiments that the refractive index of the light transparent member is not less than 1.4.

In the first embodiment, in the optical path of light emitting from the light projecting section and reaching up to the photodetecting section upon being reflected and diffracted by the scale 121, the light transmitting area which is substantially flat and substantially parallel to the scale 121 is formed on the surface of the detecting head facing the scale 121. Moreover, the light transparent resin 190 which is a light transparent member is disposed in the space between the surface of the detecting head and the first grating 110, and in the space between the surface of the detecting head and the third grating 130. Therefore, a dimensional tolerance and a mounting tolerance of the structure member are relaxed (becomes large). As a result of this, the optical encoder 100 can be mass produced at a low cost.

Thus, in the first embodiment, by the structure described in FIG. 1 and FIG. 2, a required accuracy of the tolerance Δzd is relaxed. Light emerged from the bare chip LED 141 is irradiated on the second grating 120 on the scale 121 via the light transparent substrate 111 on which the first grating 110 is formed. Light reflected and diffracted at the second grating 120 is reached to the photodetector 150 via the light transparent substrate 131 on which the third grating 130 is formed.

Here, when structural parameter of each element becomes a value which is set in equation (1) as an approximate value, a self image of the scale 121 with the space period p33 regulated by equation (3) is formed on the formation surface (hereinafter, called as "light receiving surface" when deemed appropriate) of the third grating 130. When the scale 121 is displaced relatively in y direction, the self image is moved in y direction. Therefore, a periodic quasi-sinusoidal waveform signal is obtained from the photodetector 150.

Each member disposed on the substrate 160 is embedded in the light transparent resin 190. Therefore, there is an advantage that a tolerance of a height difference between the first grating 110 and the third grating 130 is increased by the portion of the refractive index of the light transparent resin 190.

Moreover, side surfaces of the light transparent substrates 110 and 131 on which the first grating 110 and the third grating 130 are formed respectively are embedded in the light transparent resin 190. Therefore, a reflection at a side surface of light beams denoted by light beams 181 and 182 which are generated when the light transparent resin is not there is suppressed, and becomes as the light beams 181 and 182 shown in FIG. 2. Accordingly, light beams emerged from the light source can be guided efficiently to the photodetector 150. As a result of this, the signal amplitude of the photodetector 150 is increased and effects such as improvement in S/N as a sensor, achieving high resolution of position detection, and improvement in noise resistant property are shown. Particularly, when an angle formed by a light beam directed from the light source to the scale 121 and a side surface of the light transparent substrate 111, shown by the light beam 181, or an angle formed by a light beam directed from the scale 121 to the photodetector 150 and a side surface of the light transparent substrate 131 shown by the light beam 182, becomes a critical angle of total internal reflection, a light component along this light beam is not transmitted at all. Therefore, according to a disposing condition of component members, the signal amplitude can be improved remarkably. The reason for the light reflection being suppressed at the side surface of the light transparent substrate 111 and 131, is that a difference between the refractive index of the light transparent substrates 111 and 131, and the refractive index of the light transparent resin 190 is smaller than a difference between the refractive index of the light transparent substrate 111 and 131, and the refractive index of air. Moreover, the critical angle of total internal reflection is determined by a difference in refractive index of the light transparent substrates 111 and 131, and a refractive index of a member in contact with the light transparent substrates 111 and 131, and smaller the difference in the refractive indices, the angle of total internal reflection increases, and the total internal reflection does not occur.

Moreover, by sealing the detecting head by a resin, reliability with respect to humidity and dirt etc. can be improved. Furthermore, in the first embodiment, by sticking the light transparent substrate 111 on which the first grating 110 is formed, directly to the light source, the manufacturing of the light projecting section becomes easy. By using the bare chip LED 141 as the light source, the light projecting section can be manufactured to be thin and at a low cost.

Modified Embodiments

Each component member of the first embodiment can be transformed and modified into various types. For example, in the first embodiment, a case in which the bare chip LED is used as the light source is shown. However, the light source is not restricted to the bare chip LED, and may be any one such as a normal LED molded component and a surface emitting laser, which can form a self image.

Moreover, a case in which the third grating 130 is a group of gratings was described. However, the third grating 130 also includes a structure in which a plurality of grating group is disposed by shifting phases thereof, and a photodetector is disposed for each of the grating. Furthermore, a structure in which the second grating 120, the first grating 110, and the third grating 130 on the scale 121 are at a constant period, and a structure in which an amount of relative displacement is detected was described. However, an optical pattern for detecting a reference position can also be disposed near each of the first grating 110, the second grating 120, and the third grating 130. Moreover, a one-dimensional grating pattern of the first grating 110, the second grating 120, and the third grating 130 is described. However, a structure in which the gratings are formed in a two-dimensional form, and a two-dimensional displacement is detected is also possible.

Moreover, in FIG. 1 and FIG. 2, the surface on which the first grating 110 is formed on the light transparent substrate 111 is let to be a surface facing the bare chip LED 141. The surface on which the third grating 130 is formed on the light transparent substrate 131 is let to be a case of a surface facing the photodetector 150. However, the present invention is not restricted to this, and the first grating 110 and the third grating 130 formed on the light transparent substrate 111 and the light transparent substrate 131 respectively, may be formed on a surface facing the scale 121.

Moreover, any method can be used for covering a surrounding of the detecting head by the light transparent resin 190. For example, methods such as a method of dispensing the light transparent resin 190 corresponding to each detecting head, a method of applying a light transparent resin on an entire surface of a large size after mounting component members of several detecting heads on the large size substrate, and after curing (hardening) the resin, and isolating into individual detecting head by dicing, are available.

Moreover, regarding a method of making flat the surface of the light transparent resin 190 facing the scale 121, any method such as a resin mold method, a method of making the surface substantially flat by a surface tension, and a method of polishing after coating can be applied.

Second Embodiment

Figure 6:
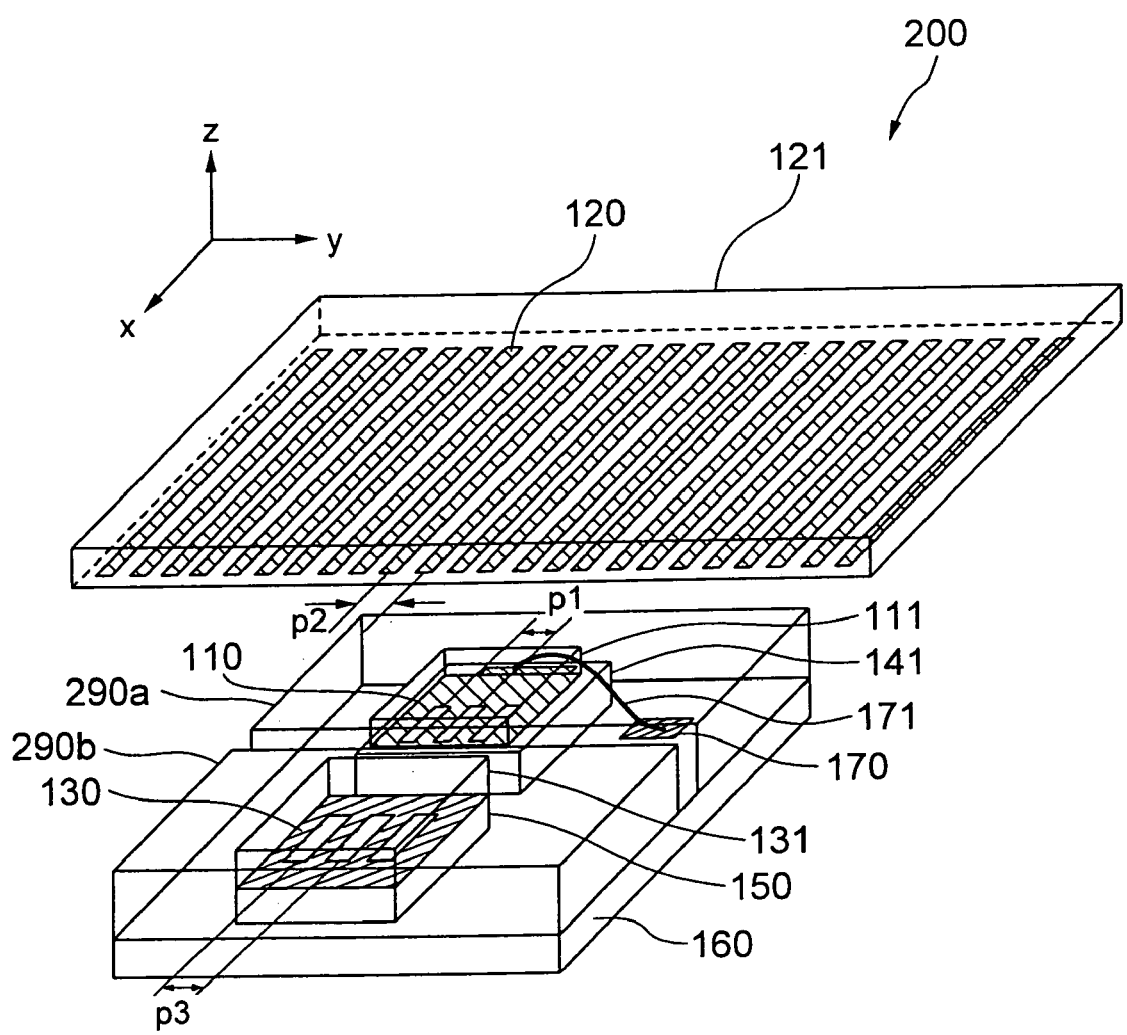
FIG. 6 is a perspective view of a structure of an optical encoder according to a second embodiment.
Figure 7:
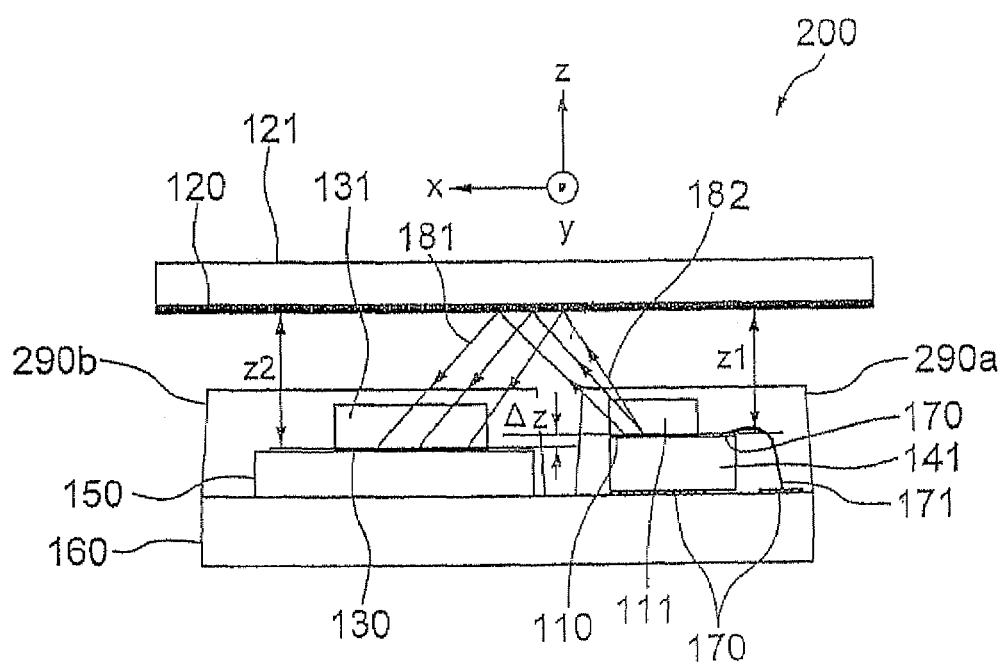
FIG. 7 is a cross-sectional view of the structure of the optical encoder according to the second embodiment.

FIG. 6 is a perspective view of a structure of an optical encoder 200 according to a second embodiment of the present invention. FIG. 7 is a cross-sectional view of the structure of the optical encoder 200 according to the second embodiment of the present invention. The second embodiment differs from the first embodiment at points that in the second embodiment, each of the projecting section in which the bare chip LED 141 and the first grating 110 are stacked, and the photodetecting section in which the photodetector 150 and the third grating 130 are stacked, is covered by a light transparent resin 290$a$ and a light transparent resin 290$b$ which are different. The same reference numerals are used for components which are same as in the first embodiment and their description is omitted to avoid repetition.

In the second embodiment, the light transparent resin 290$a$ covers an optical path from the bare chip LED 141 up to the scale 121. Moreover, the light transparent resin 290$b$ covers an optical path from the scale 121 up to the photodetector 150. Thus, light transparent resin 290$a$ and the light transparent resin 290$b$ may be ensured to have flatness only in an area through which the respective light passes.

Therefore, for example, even if a member or a manufacturing method in which the flatness of the light transparent resin is difficult to be ensured, is used, as compared to forming integrally a large light transparent resin as in the first embodiment, in the optical path from the bare chip LED 141 up to the photodetector 150 via the scale 121, it is easy to form an upper surface of the detecting head flat.

Moreover, each of the side surfaces of the light transparent substrates 111 and 131, is covered by the light transparent resin 290$a$ and the light transparent resin 290$b$ respectively. Accordingly, a surface in contact with the air is away from a light emitting portion of the bare chip LED 141. As a result of this, an effect in which, the total internal reflection of light emerged from the bare chip LED 141 at the side surface of the light transparent substrates 111 and 131 can be reduced, is shown. Actions other than this are similar to actions in the first embodiment. Moreover, each structure of the second embodiment can be transformed and modified into various types of structures similarly as in the first embodiment.

Third Embodiment

Figure 8:
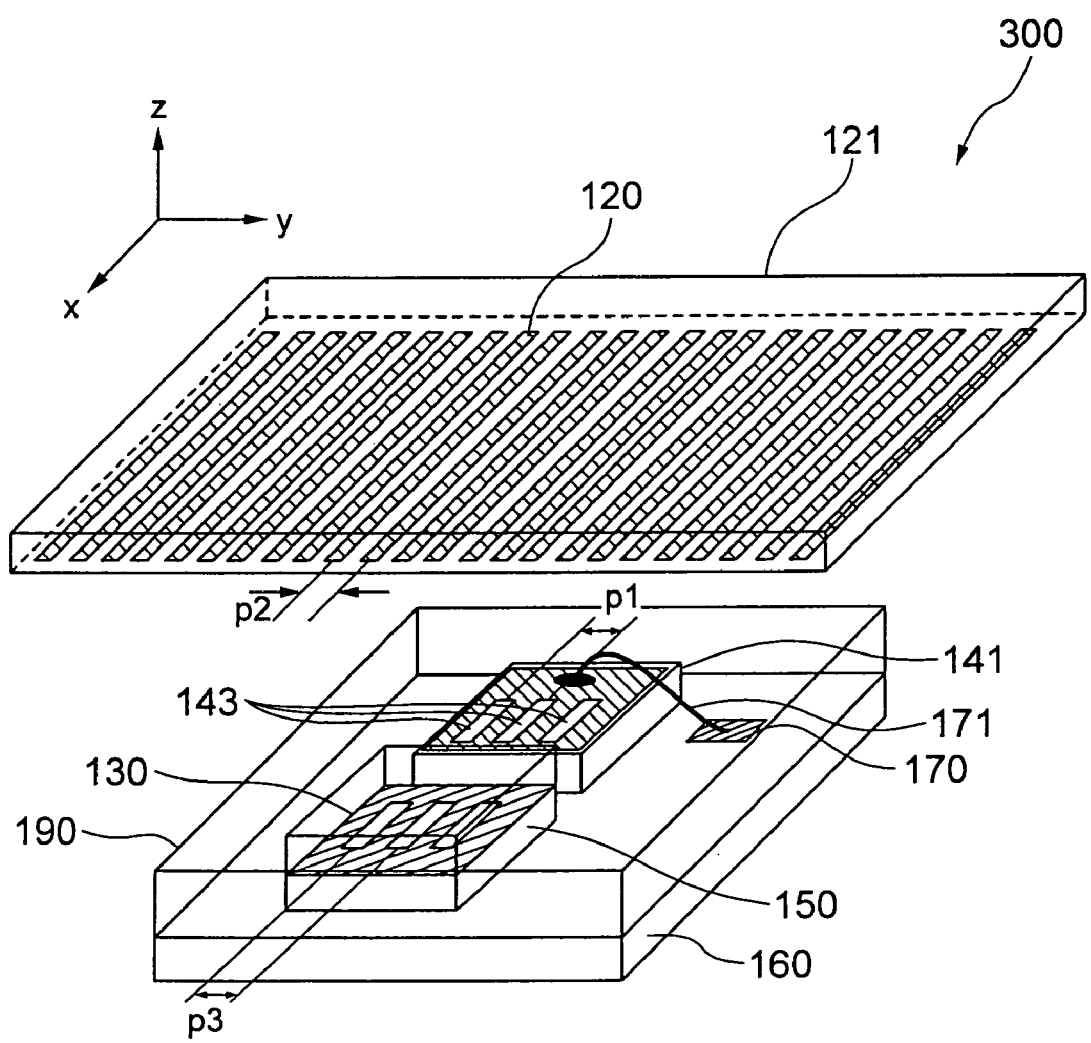
FIG. 8 is a perspective view of a structure of an optical encoder according to a third embodiment.
Figure 9:
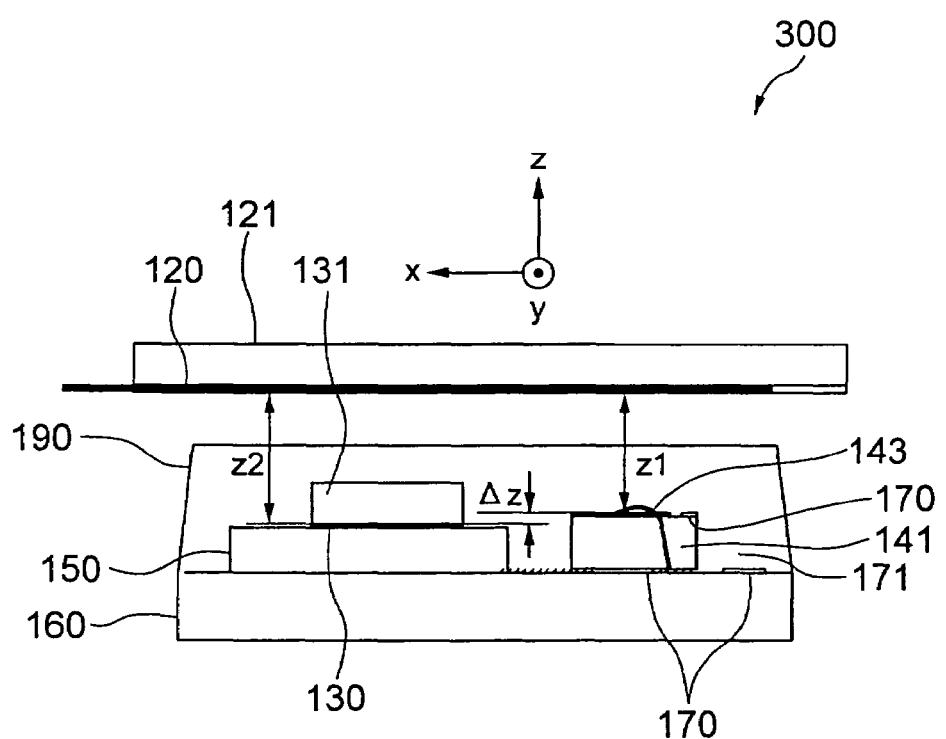
FIG. 9 is a cross-sectional view of the structure of the optical encoder according to the third embodiment.

FIG. 8 shows a perspective view of a structure of an optical encoder 300 according to a third embodiment of the present invention. FIG. 9 shows a cross-sectional view of the structure of the optical encoder 300 according to the third embodiment. The third embodiment differs from the first embodiment at a point that in the third embodiment, a plurality of periodic rectangular openings (apertures) of the first pitch (period) p1 described above is formed on an electrode 143 in the form of a grating on the upper surface of the bare chip LED 141. The same reference numerals are used for components same as in the first embodiment, and the description is omitted to avoid repetition.

The periodic openings (apertures) of the electrode 143 in the form of a grating of the bare chip LED 141 show a function similar to a function of the first grating 110. According to this structure, in addition to the effect of the first embodiment, there is an advantage that a process of stacking the bare chip LED 141 and the first grating 110 can be omitted, thereby making the manufacturing easy. Moreover, the light projecting section can be structured to be thin. Each structure of the third embodiment can be transformed and modified into various types of structures similarly as in the first embodiment.

Fourth Embodiment

Figure 10:
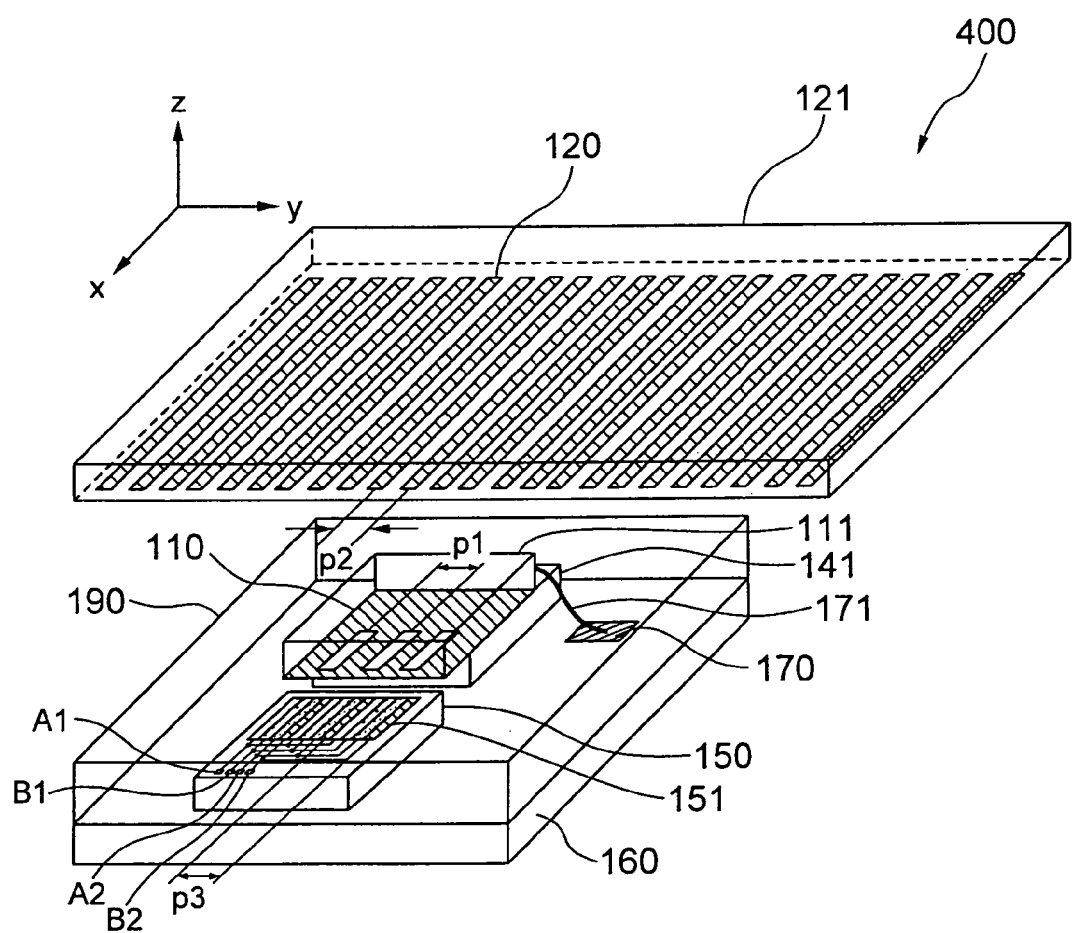
FIG. 10 is a perspective view of a structure of an optical encoder according to a fourth embodiment.
Figure 11:
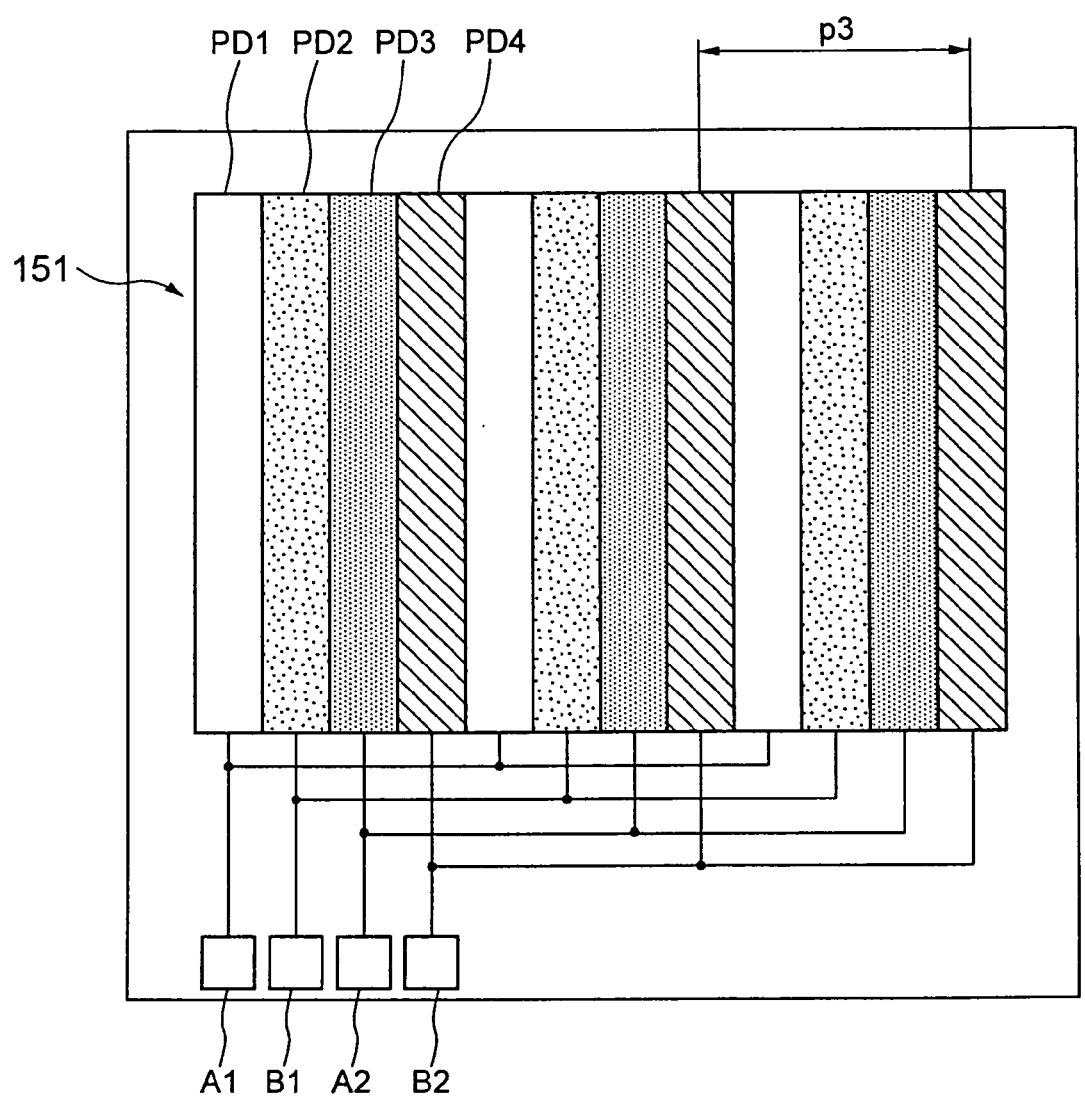
FIG. 11 is a diagram showing a structure of a light receiving element array in the fourth embodiment.
Figure 12:
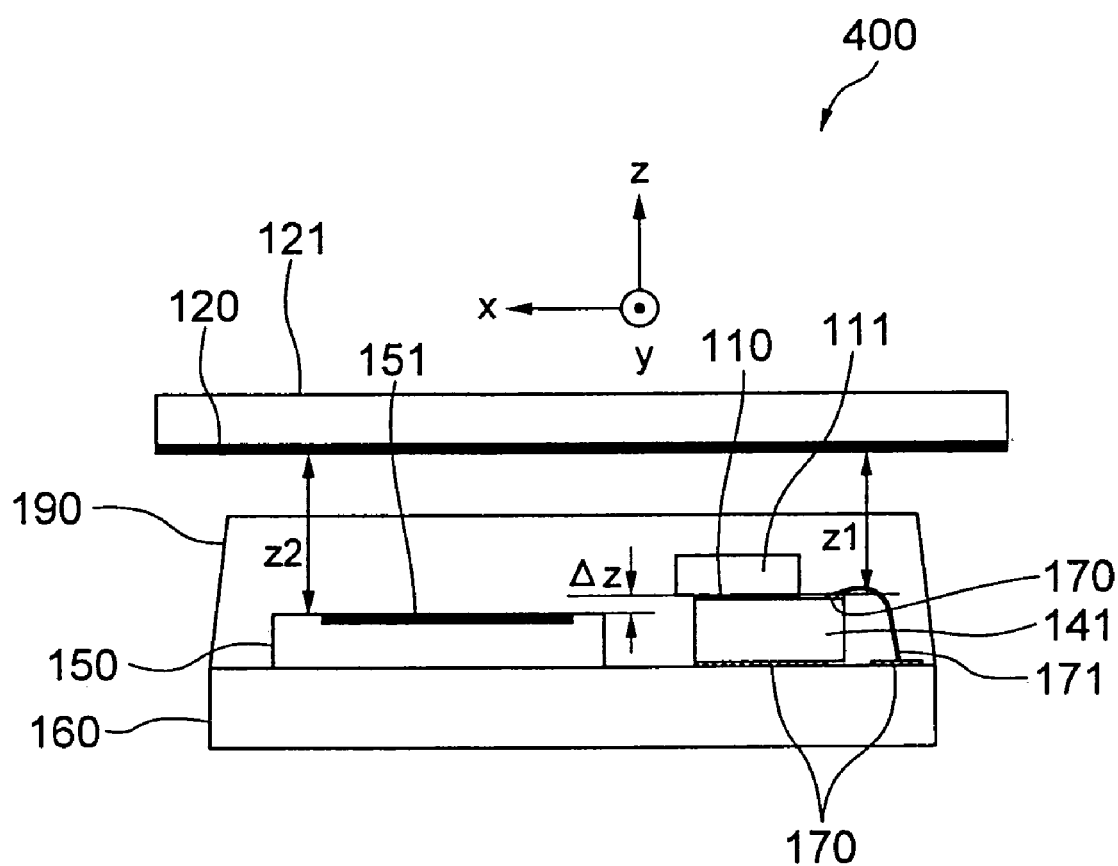
FIG. 12 is a cross-sectional view of the optical encoder according to the fourth embodiment.

FIG. 10 shows a perspective view of a structure of an optical encoder 400 according to a fourth embodiment of the present invention. FIG. 12 shows across-sectional view of the structure of the optical encoder 400 according to the fourth embodiment. The fourth embodiment differs from the first embodiment at a point that in the fourth embodiment, the photodetector is let to be a light receiving element array formed with the third pitch (period) p3 as shown in FIG. 11. The same reference numerals are used for components same as in the first embodiment, and the description of these components is omitted to avoid repetition.

FIG. 11 shows an enlarged view of a light receiving element array 151 formed on the photodetector 150. The light receiving element array 151 includes a plurality of sets of four photo diodes PD1, PD2, PD3, and PD4 having a rectangular shape, combined together.

The photodiodes PD1, PD2, PD3, and PD4 are disposed in the form of comb teeth, each shifted through $\frac{1}{4} \times p3$. Moreover, an electric signal from each of the photodiodes PD1, PD2, PD3, and PD4 is output from four electrode pads A1, B1, A2, and B2.

When the scale 121 is displaced relatively in y direction, quasi-sinusoidal sine wave signals having a phase differed by only ¼ period are obtained from the four electrode pads A1, B1, A2, and B2. Accordingly, it is possible to detect a direction of displacement (distinction of a direction of movement).

Furthermore, by performing an interpolation treatment of the output signal (interpolation treatment of displacement amount), it is possible to detect an amount of displacement by a resolution which is significantly minute than the second pitch of the second grating 120 formed on the scale 121.

Even in the first embodiment, a similar effect in principle is possible by disposing a plurality of sets of the third grating 130 and the photodetector 150. Here, in the fourth embodiment, the plurality of photodiodes PD1, PD2, PD3, and PD4 having a different phase can be disposed at substantially the same position. Therefore, it is possible to relax significantly a rotational tolerance in the plane as compared to a case in which the plurality of sets of the third grating 130 and the photodetector 150 is positioned at different positions. Furthermore, the light transparent substrate on which the third grating 130 is formed is not required to be mounted. Therefore, in the fourth embodiment, a function of the third grating 130 can be realized easily with high accuracy and at further lower cost.

Even in the fourth embodiment, as a matter of course, various transformations and modifications are possible. The pitch of the photodiodes PD1, PD2, PD3, and PD4 may also be in integral multiples of P3. Moreover, amount through which each of the photodiodes PD1, PD2, PD3, and PD4 is shifted (shifting amount) is not restricted to ¼×p3, and various configurations such as three sets having the shifting amount ⅓×p3 (three sets of photodiodes), four sets having the shifting amount ¾×p3 (four sets of photodiodes), and m sets having the shifting amount 1/m×p3 (where m is a natural number, and m sets of photodiodes).

Fifth Embodiment

Figure 13:
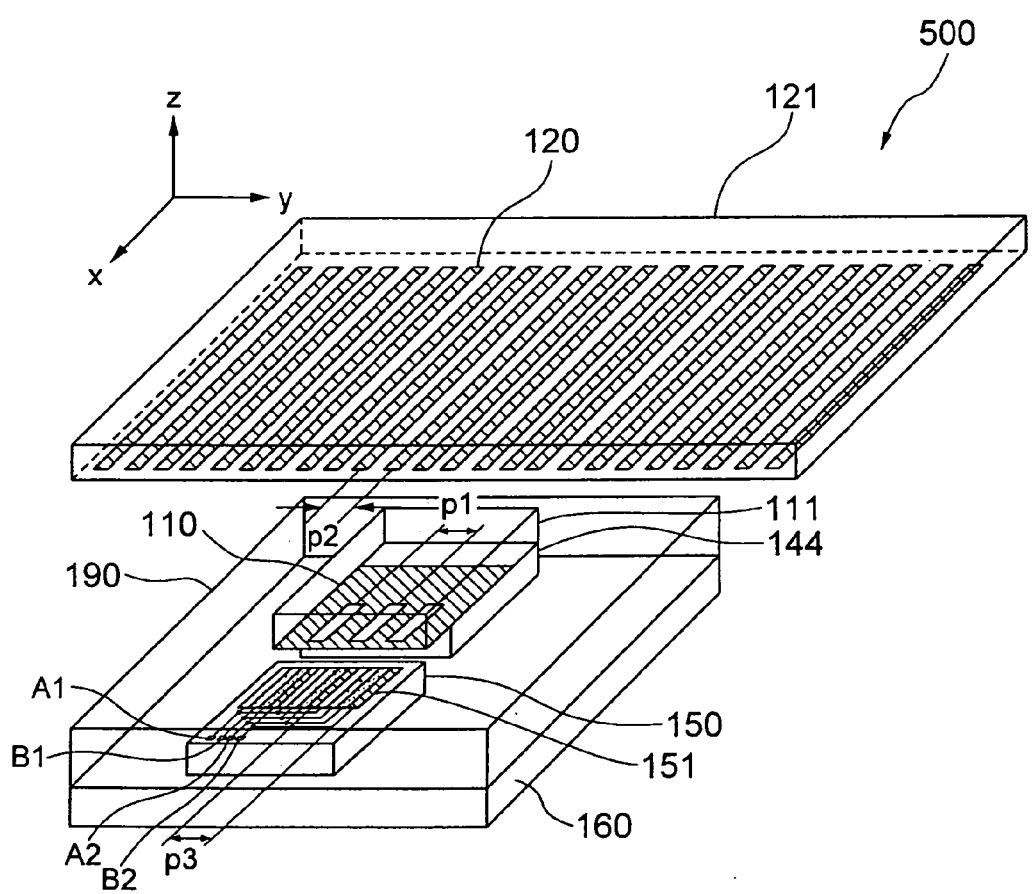
FIG. 13 is a perspective view of a structure of an optical encoder according to a fifth embodiment.
Figure 14:
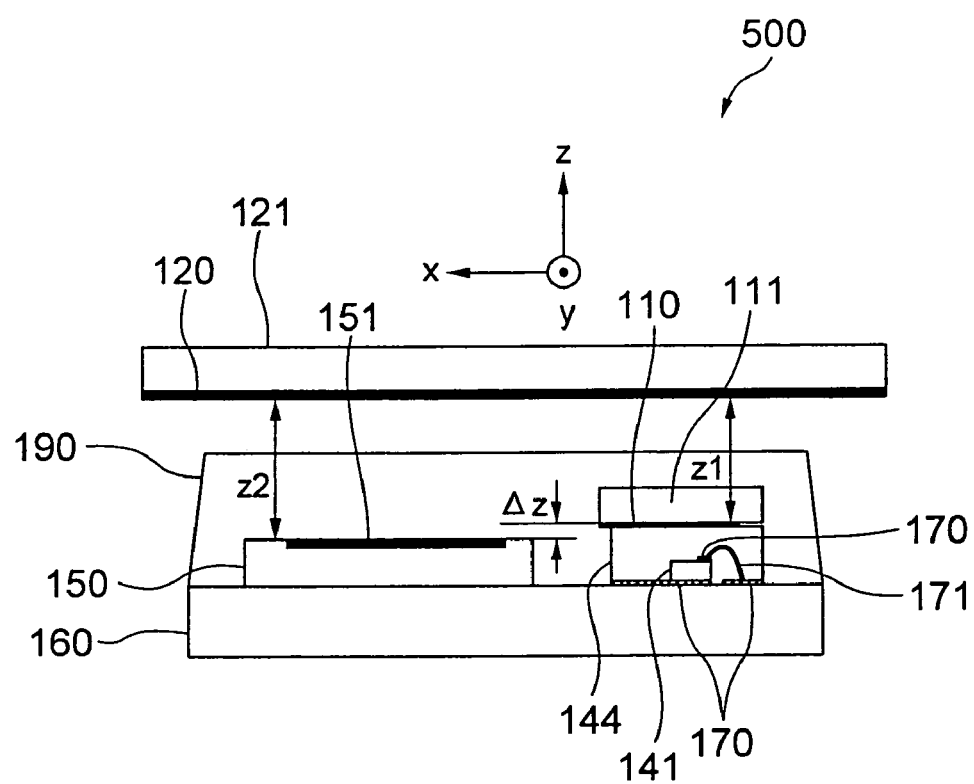
FIG. 14 is a cross-sectional view of the structure of the optical encoder according to the fifth embodiment.

FIG. 13 shows a perspective view of a structure of an optical encoder 500 according to a fifth embodiment of the present invention. FIG. 14 shows across-sectional view of the structure of the optical encoder 500 according to the fifth embodiment. In the fifth embodiment, a resin mold LED 144 is used as the light source of the light projecting section. In the resin mold LED 144, the electrode pad 170 on the upper surface of the bare chip LED 141 is connected to the electrode pad 171 on a lower surface of the resin mold LED 144 by the electroconductive wire 171. Moreover, the other electrode pad 170 of the bare chip LED 141 is connected directly to the electrode pad 170 on a lower surface of the resin mold LED 144 by a material such as a solder material. Furthermore, the light transparent substrate 111 on which the first grating 110 is formed is stacked on an upper surface of the resin mold LED 144. The rest of the structure is similar to the structure in the fourth embodiment.

The basic action of the fifth embodiment is similar to the basic action of the fourth embodiment. By replacing the bare chip LED by the resin mold LED 144, there is some increase in a thickness and planar dimensions of the light projecting section. However, a size of the substrate on which the first grating 110 is formed is increased, thereby easing the handling, and a bonding pad of the conductive wire disposed on the upper surface of the bare chip LED is not required. Accordingly, there is an advantage that the mounting of the light transparent substrate 111 on which the resin mold LED 144 and the first grating 110 are formed becomes easy.

Generally, a tolerance for variation in a height of the resin mold LED 144 is about ±60 µm. According to the structure of the fifth embodiment, when the refractive index of the light transparent resin 190 is let to be nindex, the tolerance for variation in the height of the resin mold LED 144 can be reduced to 1/nindex. For example, when nindex is let to be 2 (nindex=2), the tolerance for the variation in the height of the resin mold LED 144 is equal to about ±30 µm which is a value when disposed in the air. Therefore, even when the resin mold LED 144 having the tolerance for variation in the height ±60 µm is used, it is possible to realize a range of tolerance of the experiment result mentioned above.

Each structure of the fifth embodiment can be transformed and modified to various structures. For example, the upper surface of the resin mold LED 144 is not required to be flat entirely, and a joining portion of the light transparent substrate 111 on which the first grating 110 is formed may be let to be flat.

Moreover, a concavity and convexity having a function of a lens may be formed on a portion other than the flat area on the surface of the resin mold LED 144. Accordingly, it is also possible to control an angle of irradiation of the light beam such that the light beam is guided effectively to the photodetector 150.

Sixth Embodiment

Figure 15:
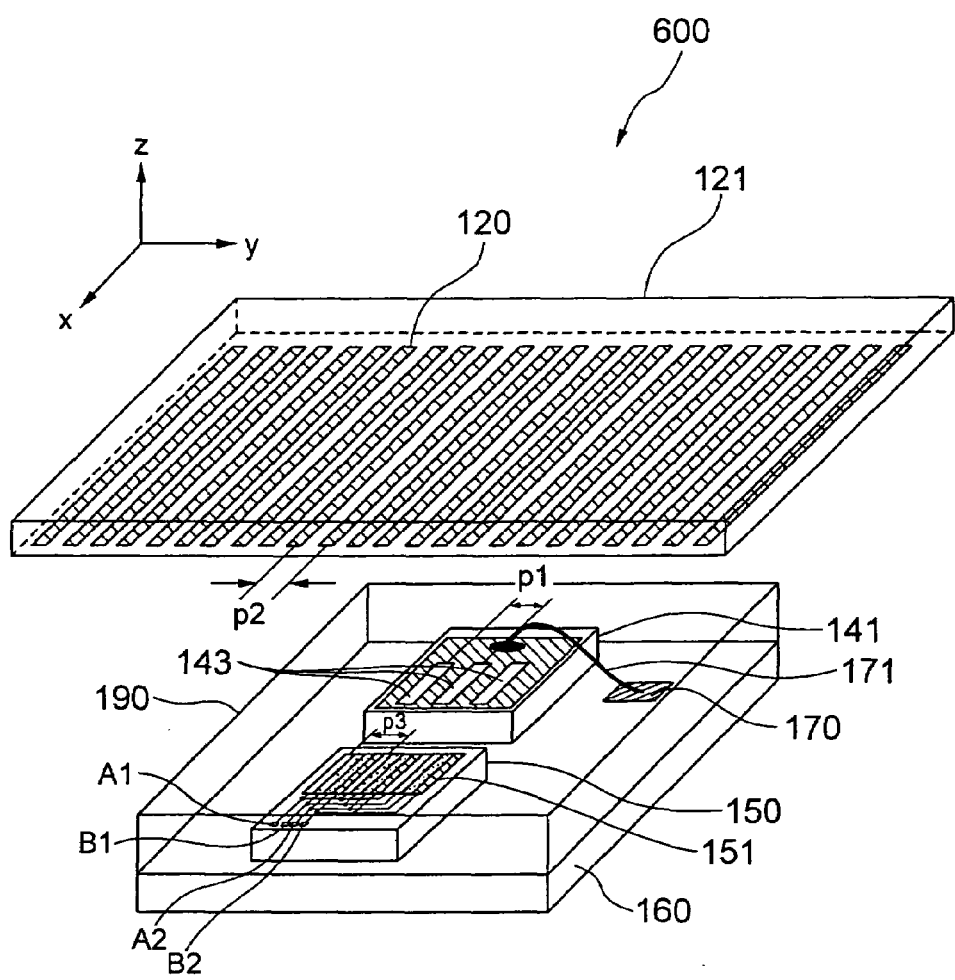
FIG. 15 is a perspective view of a structure of an optical encoder according to a sixth embodiment.
Figure 16:
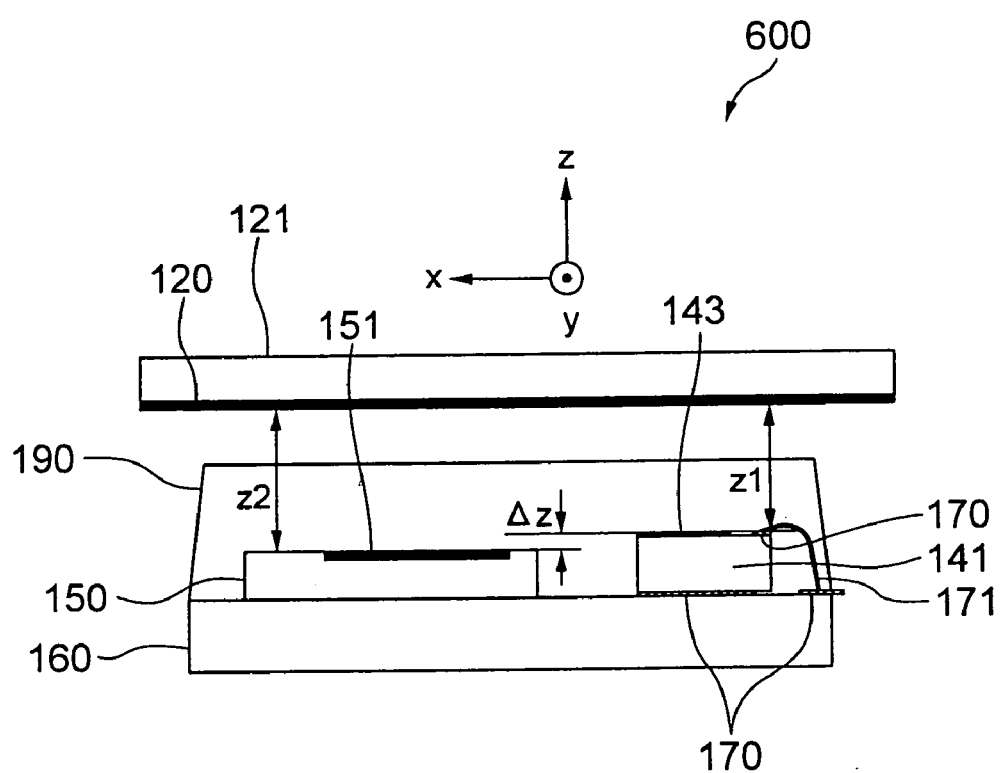
FIG. 16 is a cross-sectional view of the structure of the optical encoder according to the sixth embodiment.

FIG. 15 shows a perspective view of a structure of an optical encoder 600 according to a sixth embodiment of the present invention. FIG. 16 shows across-sectional view of the structure of the optical encoder 600 according to the present invention. In the sixth embodiment, the structure of the light projecting section is formed identically as in the third embodiment, and the photodetecting section is formed identically as in the fourth embodiment.

An action of the light projecting section is the same as an action of the light projecting section in the third embodiment. Moreover, an action of the photodetecting section is same as an action of the photodetecting section in the fourth embodiment. Therefore, the light transparent substrates 111 and 131 on which the first grating 110 and the third grating 130 are formed are not required to be mounted. Accordingly, it is possible to realize a function of the first grating 110 and the third grating 130 with high accuracy and at low cost. Each structure of the sixth embodiment can be transformed and modified into various types of structures. Examples of transformation are similar as in the third embodiment and in the fourth embodiment.

Seventh Embodiment

Figure 17:
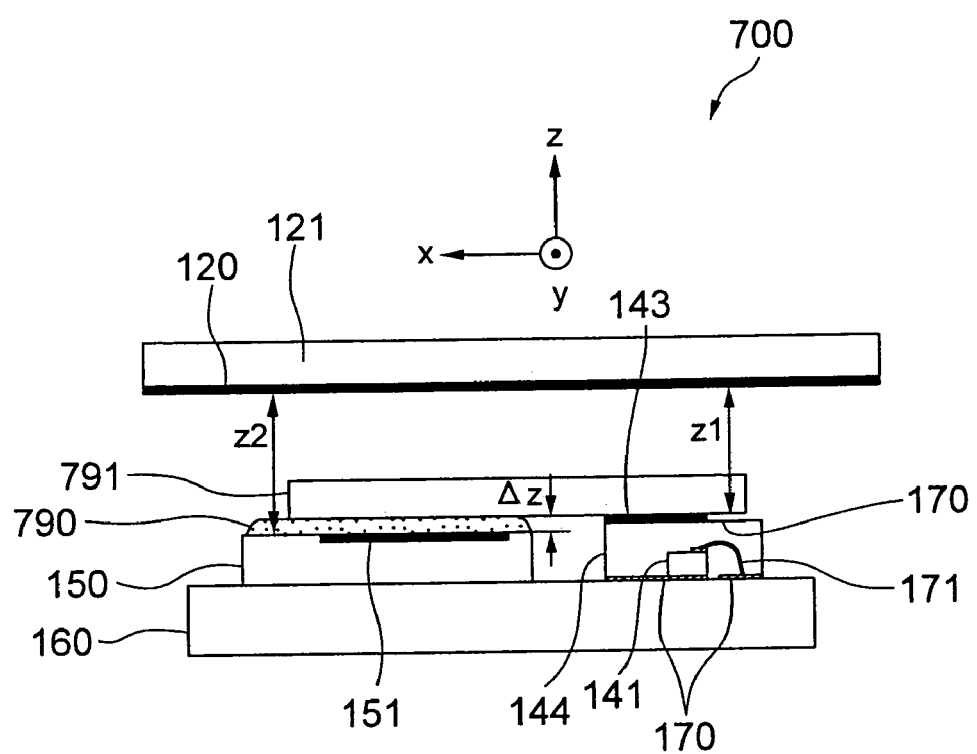
FIG. 17 is a cross-sectional view of a structure of an optical encoder according to a seventh embodiment.

FIG. 17 shows a cross-sectional view of a structure of an optical encoder 700 according to a seventh embodiment of the present invention. In the seventh embodiment, in the light projecting section, a light transparent substrate 791 on which a first grating 143 is formed is stacked on the upper surface of the resin mold LED 144, and the light receiving element array 151 is used in the photodetecting section.

In the seventh embodiment, instead of forming the light transparent resin so as to cover the entire light projecting section and the photodetecting section, a light transparent member 791 in the form of a plate is disposed on an upper portion of the light projecting section and the photodetecting section, such that the light transparent member 791 faces in parallel with a surface of the scale 121. Moreover, it is a structure in which a light transparent resin 790 is disposed in a gap developed by a difference in a height of the light projecting section and a height of the photodetecting section. The light transparent resin 790 may be allowed to have a function of an adhesive.

Modified Embodiments

Figure 18:
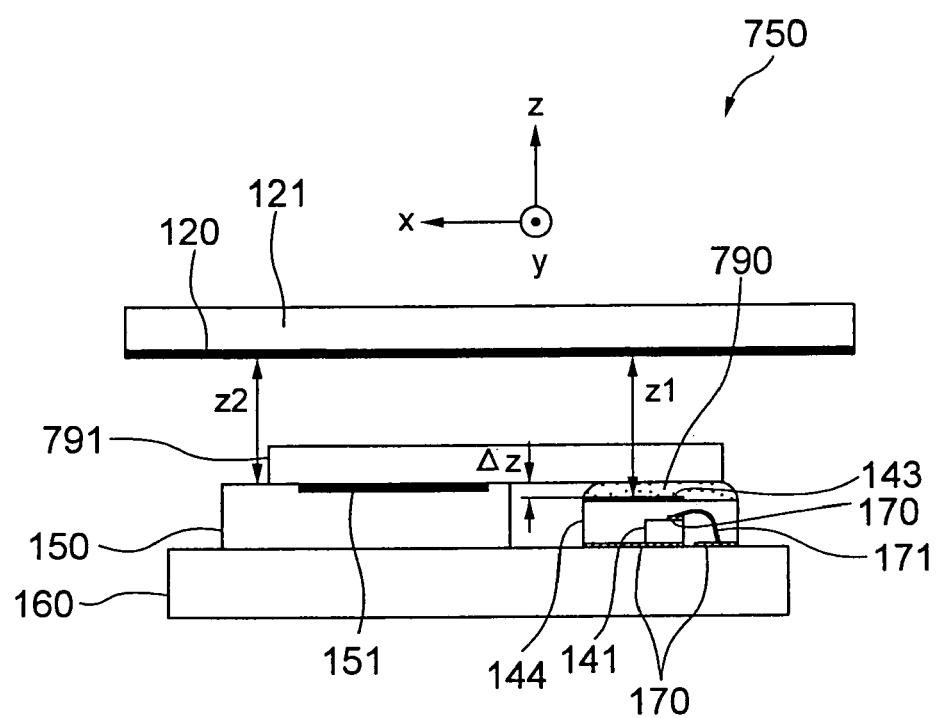
FIG. 18 is a cross-sectional view of a structure of an optical encoder according to a modified embodiment of the seventh embodiment.

FIG. 18 shows a cross-sectional view of a structure of an optical encoder 750 according to a modified embodiment of the seventh embodiment. FIG. 17 is an example of a structure in which the light transparent resin 790 is disposed between the light receiving element array 151 (third grating) and the light transparent member 791 in the form of a plate. Whereas, the modified embodiment of the seventh embodiment is an example in which, the light transparent resin 790 is disposed between the electrode 143 in the form of a grating (first grating) and the light transparent member 791 in the form of a plate. The rest of the structure is similar to the structure in the first embodiment.

The light transparent resin 790 is disposed between the electrode 143 in the form of a grating (first grating) and the light transparent member 791 in the form of a plate, or between the light receiving element array 151 (third grating) and the light transparent member 791 in the form of a plate. Therefore, it is possible to have a substantial tolerance of height of disposing of the electrode 143 in the form of a grating (first grating) and the light receiving element array 151 (third grating).

Each structure of the modified embodiment of the seventh embodiment can be transformed and modified into various types of structures. Space to be embedded (filled) by the light transparent resin 791 need not necessarily be restricted to the gap between the electrode 143 in the form of a grating (first grating), the light receiving element array 151 (third grating), and the light projecting section and the photodetecting section. For example, a structure in which a side surface of the light projecting section and the photodetecting section are embedded may also be used. Other modified embodiments are similar to the fifth embodiment and the sixth embodiment for example.

Eighth Embodiment

Figure 19:
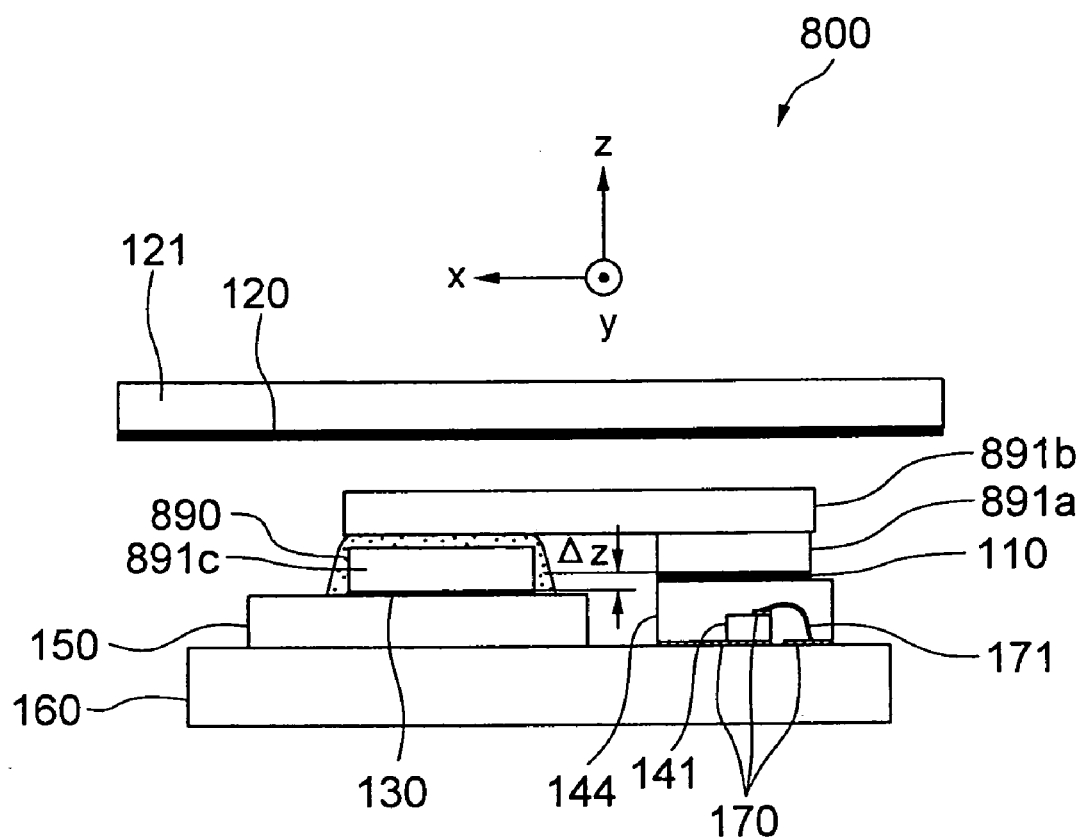
FIG. 19 is a cross-sectional view of a structure of an optical encoder according to an eighth embodiment.

FIG. 19 shows a cross-sectional view of a structure of an optical encoder 800 according to an eighth embodiment of the present invention. The eighth embodiment is similar to the first embodiment except for the structure of the light projecting section and the photodetecting section, in which the resin mold LED is used instead of the bare chip LED.

Moreover, instead of forming the light transparent resin 190 so as to cover the entire light projecting section and the photodetecting section, light transparent members 891a, 891b, and 891c in the form of a plate are disposed on the upper portion of the light projecting section and the photodetector 150, such that the light transparent members face in parallel with the surface of the scale 121. Moreover, it is a structure in which a light transparent resin 890 is disposed in the gap developed by a difference in the height of the light projecting section and the height of the photodetector 150. The light transparent resin 890 may be allowed to have the function of an adhesive.

Modified Embodiment

Figure 20:
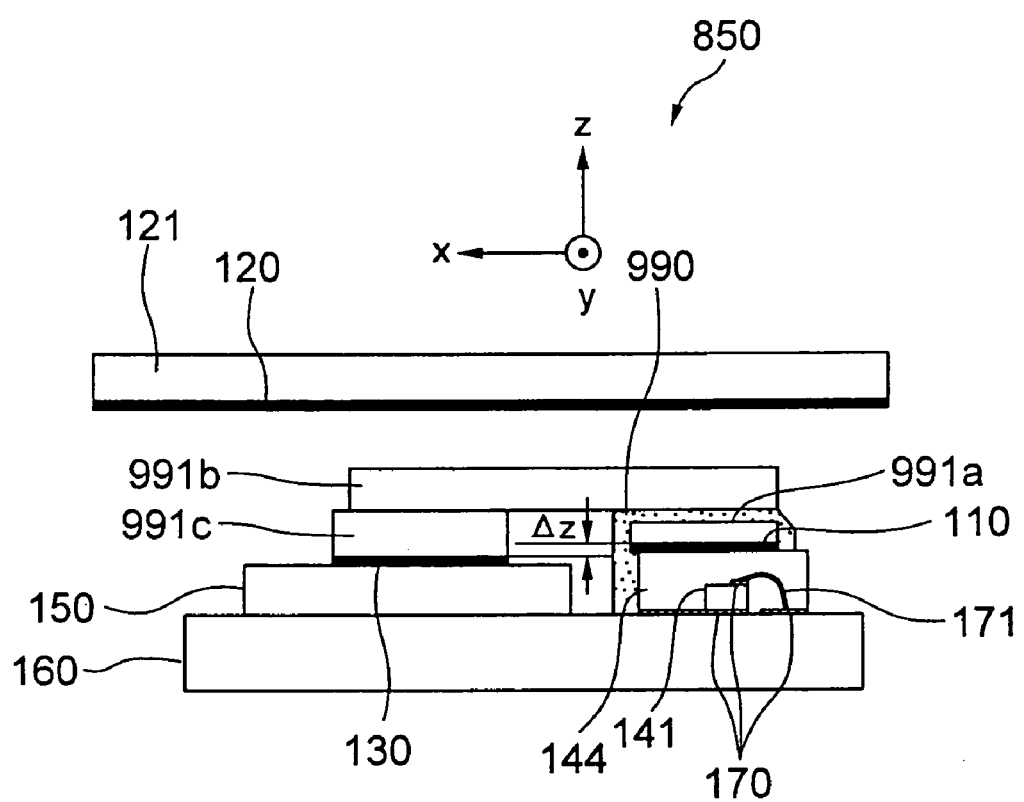
FIG. 20 is a cross-sectional view of a structure of an optical encoder according to a modified embodiment of the eighth embodiment.

FIG. 20 shows a cross-sectional view of a structure of an optical encoder 850 according to a modified embodiment of the eighth embodiment. In the modified embodiment of the eighth embodiment, light transparent members 991a, 991b, and 991c in the form of a plate are disposed. The modified embodiment of the eighth embodiment is an example of a structure in which a light transparent resin 990 is disposed between the first grating 110 and the light transparent member 991b in the form of a plate. The rest of the structure is similar to the structure in the first embodiment.

In the eighth embodiment and the modified embodiment of the eighth embodiment, the light transparent resins 890 and 990 are disposed between the first grating 110 and the light transparent member 991b in the form of a plate, or between the third grating 130 and the light transparent member 891b in the form of a plate. Therefore, it is possible to have a substantial tolerance of height of disposing the first grating 110 and the third grating 130.

Each structure of the modified embodiment of the eighth embodiment can be transformed and modified into various types of structures. Space to be embedded (filled) by the light transparent resins 890 and 990, need not necessarily be restricted to the gap between the first grating 110, the second grating 130, and the light projecting section and the photodetector. For example, a structure in which the side surface of the light projecting section and the photodetecting section are embedded may also be used. Other modified embodiments are similar to the first embodiment for example.

Moreover, in each of the embodiments described above, the structure can be let to be the following structures (1), (2), and (3).

(1) A structure in which a wavelength of the light source is set in a region of ultraviolet light or visible light, the light transparent member, the light transparent substrate, and the light transparent resin have an optical transparency for the wavelength of the light source, but the optical transmittance for infra-red light is not more than ½.

(2) A structure in which the wavelength of the light source is set in a region of ultraviolet light or infra-red light, the light transparent member, the light transparent substrate, and the light transparent resin have the optical transparency for the wavelength of light source, but the optical transmittance for the visible light is not more than ½.

(3) A structure in which the wavelength of the light source is set in a region of the visible light or the infra-red light, the light transparent member, the light transparent substrate, and the light transparent resin have the optical transparency for the wavelength of light source, but the optical transmittance for the ultraviolet light is not more than ½.

Thus, the light transparent member and the light transparent resin may be let to be a member and a resin which have the optical transparency for the wavelength of the light source, and may not be let to have the optical transparency for a wavelength other than the wavelength of the light source. When the wavelength of the light source is set in the region of the ultraviolet light or the visible light for example, the light transparent member, the light transparent substrate, and the light transparent resin have the optical transparency for the wavelength of the light source, but may be let to have a less optical transmittance for the infra-red light. Accordingly, in an environment of substantial infra-red light, sensing in which an effect due to the infra-red light is suppressed is possible.

Moreover, when the wavelength of the light source is set in the region of the ultraviolet light or the infra-red light, the light transparent member, the light transparent substrate, and the light transparent resin have the optical transparency for the wavelength of the light source, but may be let to have a less optical transmittance for the visible light. Accordingly, in an environment of substantial visible light, a sensing in which an effect due to the visible light is suppressed is possible.

Furthermore, when the wavelength of the light source is set in the region of the visible light or the infra-red light, the light transparent member, the light transparent substrate, and the light transparent resin have the optical transparency for the wavelength of the light source, but may be let to have a less optical transmittance for the ultraviolet light. Accordingly, in an environment of substantial ultraviolet light, a sensing in which an effect due to the ultraviolet light is suppressed is possible.

Moreover, it is needless to say that the structures in embodiments from the first embodiment to the eight embodiment can be combined voluntarily. Thus, the present invention can have various modifications which fairly fall within the basic teachings herein set forth.

Thus, an optical encoder according to the present invention is a reflecting triple grating type encoder. A light transparent member is disposed in a space between a surface of a detecting head and a first grating, and in a space between the surface of the detecting head and a third grating. Accordingly, it is possible to relax a tolerance of $\Delta zd$ corresponding to a refractive index of the light transparent member. As a result of this, it is possible to realize a tolerance which makes the manufacturing easy, and to provide a triple grating type optical encoder which can be mass produced at a low cost.

Thus, the optical encoder according to the present invention is useful for the reflecting triple grating type optical encoder in which the tolerance between the structure members is relaxed.

What is claimed is:

1. An optical encoder comprising:
    a scale which is installed on one of members of which a displacement is detected; and
    a detecting head which is installed on other member which is displaced relatively with respect to the one of the members, and which is disposed facing the scale, wherein
    the scale is provided with a second grating which has an optical pattern of a second pitch with respect to a direction of a relative displacement, and
    the detecting head is provided with
    a light projecting section which irradiates a predetermined light on the scale, and
    a photodetecting section which detects a movement of a self image which is formed on a light receiving surface of a photodetector by light which is irradiated from the light projecting section to the scale, and which is reflected and diffracted by the second grating, wherein
    the light projecting section is structured to irradiate the predetermined light by combining a light source and a first grating which is disposed on a side facing the scale with respect to the light source, and
    an optical grating of a first pitch is formed in the first grating with respect to the direction of the relative displacement, and
    the photodetecting section is structured to detect the movement of the self image by combining the photodetector and a third grating which is disposed on the light receiving surface of the photodetector, and
    an optical grating of a third pitch is formed in the third grating for the direction of the relative displacement, and
    each of a formation surface of the first grating and a formation surface of the third grating is disposed substantially parallel with respect to the scale, and
    in an optical path of light emitting from the light projecting section and reaching up to the photodetecting section upon being reflected and diffracted by the scale, a light transmitting area which is substantially flat and substantially parallel to the scale is formed on a surface of the detecting head facing the scale, and
    the first grating is formed apart from the third grating, and the first grating is formed directly on a light emitting surface of the light source or a light transparent substrate on which the first grating is formed and the first grating is stacked on the light emitting surface of the light source,
    the third grating is formed directly on the light receiving surface of the photodetector or an other light transparent substrate on which the third grating is formed and the third grating is stacked on the light receiving surface of the photodetector, and
    a light transparent resin which has a refractive index greater than 1 is disposed in a space from the first grating up to the surface of the detecting head, and in a space from the third grating up to the surface of the detecting head, except in a space where the light transparent substrate is disposed.

2. The optical encoder according to claim 1, wherein the first grating is one of an optical grating formed directly on the light emitting surface of the light source, or an electrode pattern in a form of a grating which also serves as an electric current injecting electrode of the light source.

3. The optical encoder according to claim 1, wherein the light source is a bare chip or a surface emitting semiconductor device in which the bare chip is seal-molded.

4. The optical encoder according to claim 1, wherein at least one of the first grating and the third grating is an optical grating formed in the light transparent substrate, and
    a side surface of the light transparent substrate is covered by the light transparent resin.

5. The optical encoder according to claim 1, wherein a light transparent member in a form of a plate disposed parallel to the scale is disposed on a side facing the scale with respect to the first grating and the third grating, and
    one of the light transparent substrate and the light transparent resin is disposed in a space between the light transparent member in the form of a plate and the first grating, and in a space between the light transparent member in the form of a plate and the third grating.

6. The optical encoder according to claim 1, wherein at least one of a light transparent member in a form of a plate, the light transparent substrate, and the light transparent resin has a predetermined optical transmittance with respect to a predetermined wavelength region in which a light from the light source is emitted, and the optical transmittance is not greater than ½ with respect to at least one of a light of a wavelength side longer than the predetermined wavelength region, and a light of a wavelength side shorter than the predetermined wavelength region.

7. The optical encoder according to claim 1, wherein a refractive index of the light transparent resin is not less than 1.4 in a central wavelength of a light emitted from the light source.

8. An optical encoder comprising:
    a scale which is installed on one of members of which a displacement is detected; and
    a detecting head which is installed on other member which is displaced relatively with respect to the one of the members, and which is disposed facing the scale, wherein
    the scale is provided with a second grating which has an optical pattern of a second pitch with respect to a direction of a relative displacement, and
    the detecting head is provided with
    a light projecting section which irradiates a predetermined light on the scale, and
    a photodetecting section which detects a movement of a self image which is formed on a light receiving surface of a photodetector by light which is irradiated from the light projecting section to the scale, and which is reflected and diffracted by the second grating, wherein the light projecting section is structured to irradiate the predetermined light by combining a light source and a first grating which is disposed on a side facing the scale with respect to the light source, and an optical grating of a first pitch is formed in the first grating with respect to the direction of the relative displacement, and the photodetecting section is structured to detect the movement of the self image by at least one light receiving element array, which is operated as a third grating disposed on the light receiving surface of the photodetector, and the light receiving element array includes light receiving elements having a pitch of substantial integral multiples of a periodic intensity distribution of the self image, and the light receiving surface, and a formation surface of the first grating are disposed substantially parallel with respect to the scale, and in an optical path of light emitting from the light projecting section and reaching up to the photodetecting section upon being reflected and diffracted by the scale, a light transmitting area which is substantially flat and substantially parallel to the scale is formed on a surface of the detecting head facing the scale, and the first grating is formed apart from the third grating, and the first grating is formed directly on a light emitting surface of the light source or a light transparent substrate on which the first grating is formed, and the first grating is stacked on the light emitting surface of the light source, and a light transparent resin which has a refractive index greater than 1 is disposed in a space from the first grating up to the surface of the detecting head, and in a space from the light receiving array up to the surface of the detecting head, except in a space where the light transparent substrate is disposed.

9. The optical encoder according to claim 8, wherein the first grating is one of an optical grating formed directly on the light emitting surface of the light source, or an electrode pattern in a form of a grating which also serves as an electric current injecting electrode of the light source.

10. The optical encoder according to claim 8, wherein the light source is one of a bare chip and a surface emitting semiconductor device in which the bare chip is seal-molded.

11. The optical encoder according to claim 8, wherein the first grating is an optical grating formed in the light transparent substrate, and a side surface of the light transparent substrate is covered by the light transparent resin.

12. The optical encoder according to claim 8, wherein a light transparent member in a form of a plate disposed parallel to the scale is disposed on a side facing the scale with respect to the first grating and the light receiving surface, and one of the light transparent substrate and the light transparent resin is disposed in a space between the light transparent member in the form of a plate and the first grating, and in a space between the light transparent member in the form of a plate and the light receiving surface.

13. The optical encoder according to claim 8, wherein at least one of a light transparent member in a form of a plate, the light transparent substrate, and the light transparent resin has a predetermined optical transmittance with respect to a predetermined wavelength region in which a light from the light source is emitted, and the optical transmittance is not greater than $1/2$ with respect to at least one of a light of a wavelength side longer than the predetermined wavelength region, and a light of a wavelength side shorter than the predetermined wavelength region.

14. The optical encoder according to claim 8, wherein a refractive index of the light transparent resin is not less than 1.4 in a central wavelength of a light emitted from the light source.

* * * * *